US010863144B2

(12) United States Patent
Snyder et al.

(10) Patent No.: US 10,863,144 B2
(45) Date of Patent: *Dec. 8, 2020

(54) SYSTEM AND METHOD FOR PROTECTING CRITICAL DATA ON CAMERA SYSTEMS FROM PHYSICAL ATTACK

(71) Applicant: Cisco Technology, Inc., San Jose, CA (US)

(72) Inventors: Ian Matthew Snyder, San Francisco, CA (US); Nicholas Dye Abalos, San Francisco, CA (US); Peter W. Gleason, Berkeley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,543

(22) Filed: Nov. 27, 2019

(65) Prior Publication Data

US 2020/0099897 A1    Mar. 26, 2020

Related U.S. Application Data

(63) Continuation of application No. 15/818,328, filed on Nov. 20, 2017, now Pat. No. 10,506,202.

(51) Int. Cl.
*H04N 7/18* (2006.01)
*G06K 9/00* (2006.01)
*G06F 11/14* (2006.01)
*H04L 12/24* (2006.01)

(52) U.S. Cl.
CPC ......... *H04N 7/183* (2013.01); *G06F 11/1451* (2013.01); *G06F 11/1464* (2013.01); *G06K 9/00335* (2013.01); *G06K 9/00771* (2013.01); *H04N 7/188* (2013.01); *G06F 2201/805* (2013.01); *H04L 41/12* (2013.01)

(58) Field of Classification Search
None
See application file for complete search history.

(56) References Cited

U.S. PATENT DOCUMENTS

| 6,925,409 | B2 | 8/2005 | Smith et al. |
| 7,299,326 | B2 | 11/2007 | Lin et al. |
| 7,840,992 | B1 | 11/2010 | Dufrene et al. |
| 8,583,601 | B1 | 11/2013 | Claudatos et al. |

(Continued)

*Primary Examiner* — Jayanti K Patel
*Assistant Examiner* — Stefan Gadomski
(74) *Attorney, Agent, or Firm* — Polsinelli PC

(57) ABSTRACT

Systems, methods, and computer-readable media for protecting critical data on cameras from physical attacks. In some examples, a camera at a particular site monitors data captured by the camera and, based on the data, detects one or more predetermined conditions indicating a threat to the camera. Based on the one or more predetermined conditions indicating the threat to the camera, the camera determines a threshold risk of damage to data stored at the camera. In response to determining the threshold risk of damage to the data stored at the camera, the camera selects, from a plurality of content items in the data stored at the camera, a subset of content items based on respective priorities associated with the plurality of content items, and sends, via a network, the subset of content items to one or more destinations to yield a prioritized backup of the plurality of content items.

20 Claims, 12 Drawing Sheets

(56) References Cited

U.S. PATENT DOCUMENTS

| | | |
|---|---|---|
| 9,110,848 B1 | 8/2015 | Kim |
| 10,540,549 B2 * | 1/2020 | Zhao ................. G06Q 50/22 |
| 2003/0084337 A1 | 5/2003 | Simionescu et al. |
| 2003/0193395 A1 | 10/2003 | Akisha et al. |
| 2004/0068388 A1 | 4/2004 | Smith et al. |
| 2004/0119819 A1 * | 6/2004 | Aggarwal ........ G08B 13/19608 348/143 |
| 2004/0186813 A1 * | 9/2004 | Tedesco ............. G06K 9/00624 706/14 |
| 2006/0243798 A1 * | 11/2006 | Kundu ............... G06K 9/00718 235/383 |
| 2007/0136541 A1 | 6/2007 | Herz et al. |
| 2007/0194097 A1 | 8/2007 | Jones et al. |
| 2008/0100704 A1 | 5/2008 | Venetianer et al. |
| 2008/0198231 A1 * | 8/2008 | Ozdemir ............. G08B 25/009 348/159 |
| 2008/0208828 A1 * | 8/2008 | Boiman ............... G06K 9/6296 |
| 2008/0224862 A1 | 9/2008 | Cirker |
| 2009/0216969 A1 | 8/2009 | Winokur |
| 2009/0245573 A1 | 10/2009 | Saptharishi et al. |
| 2009/0304230 A1 * | 12/2009 | Krahnstoever ......... G06T 7/292 382/103 |
| 2010/0013917 A1 * | 1/2010 | Hanna ............. G08B 13/19608 348/143 |
| 2010/0231714 A1 | 9/2010 | Flores et al. |
| 2010/0271199 A1 | 10/2010 | Belov et al. |
| 2011/0313974 A1 | 12/2011 | Chen |
| 2012/0314063 A1 | 12/2012 | Cirker |
| 2012/0327241 A1 * | 12/2012 | Howe ................. G06K 9/00771 348/155 |
| 2013/0322255 A1 | 12/2013 | Dillon |
| 2013/0328697 A1 | 12/2013 | Lundy |
| 2014/0085480 A1 | 3/2014 | Saptharishi |
| 2014/0176708 A1 | 6/2014 | Ramakrishnan et al. |
| 2014/0244849 A1 | 8/2014 | Rizzo |
| 2014/0371599 A1 * | 12/2014 | Wu ...................... A61B 5/4082 600/476 |
| 2015/0022666 A1 | 1/2015 | Kay et al. |
| 2015/0098377 A1 | 4/2015 | Amini et al. |
| 2015/0103179 A1 | 4/2015 | Galvin |
| 2015/0121528 A1 | 4/2015 | Crowley |
| 2015/0134673 A1 | 5/2015 | Golan et al. |
| 2015/0172520 A1 | 6/2015 | Lindman et al. |
| 2015/0220782 A1 | 8/2015 | Lee et al. |
| 2016/0019427 A1 * | 1/2016 | Martin ............... G06K 9/00771 382/103 |
| 2016/0041998 A1 | 2/2016 | Hall et al. |
| 2016/0098309 A1 | 4/2016 | Kim |
| 2016/0248787 A1 * | 8/2016 | Kadambe ............... G06N 7/005 |
| 2016/0292464 A1 | 10/2016 | Alarabi |
| 2017/0085648 A1 | 3/2017 | Aw et al. |
| 2017/0155590 A1 | 6/2017 | Dillon et al. |
| 2017/0195386 A1 | 7/2017 | Nathan et al. |
| 2017/0214708 A1 | 7/2017 | Gukal et al. |
| 2018/0007409 A1 | 1/2018 | Xie et al. |
| 2018/0048850 A1 | 2/2018 | Bostick et al. |
| 2018/0181841 A1 * | 6/2018 | Vendrig ............... G06K 9/6267 |
| 2018/0196880 A1 | 7/2018 | Carter |
| 2018/0213051 A1 | 7/2018 | Bang et al. |
| 2018/0247504 A1 | 8/2018 | Siminoff et al. |
| 2018/0272992 A1 * | 9/2018 | Gage ................. G06K 9/00771 |
| 2018/0300557 A1 * | 10/2018 | Rodenas ................ G11B 27/10 |
| 2018/0307979 A1 * | 10/2018 | Selinger ............... G06N 3/0454 |
| 2018/0308330 A1 * | 10/2018 | Selinger ........... G08B 13/19663 |
| 2018/0322749 A1 * | 11/2018 | Kempel ................ G05D 1/0094 |
| 2018/0350405 A1 | 12/2018 | Marco et al. |
| 2019/0007425 A1 * | 1/2019 | Butler ................ G06K 9/00456 |
| 2019/0020658 A1 | 1/2019 | Racz et al. |
| 2019/0028382 A1 | 1/2019 | Kommula et al. |
| 2019/0096217 A1 | 3/2019 | Pourmohammad et al. |

* cited by examiner

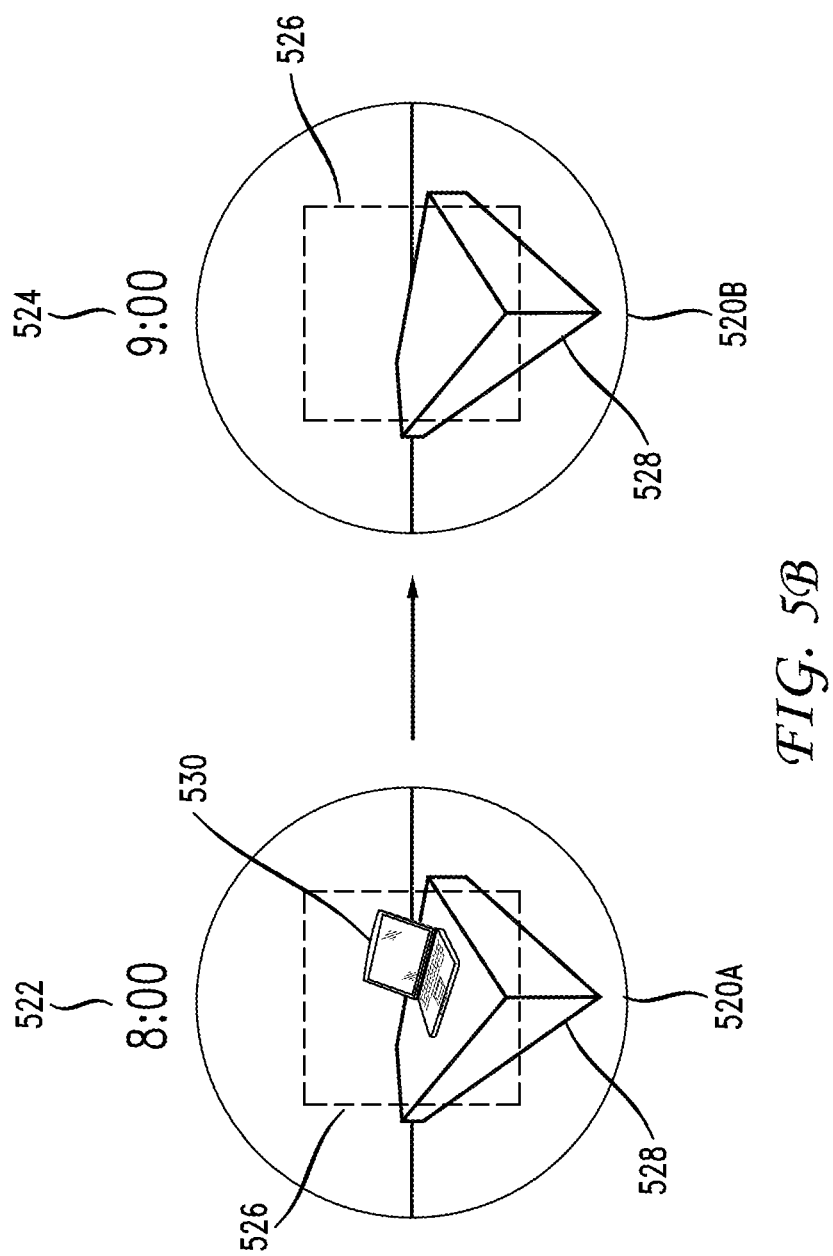

SYSTEM AND METHOD FOR PROTECTING CRITICAL DATA ON CAMERA SYSTEMS FROM PHYSICAL ATTACK

CROSS-REFERENCE TO RELATED APPLICATION

The instant Application is a Continuation of, and claims priority to, U.S. patent application Ser. No. 15/818,328 entitled SYSTEM AND METHOD FOR PROTECTING CRITICAL DATA ON CAMERA SYSTEMS FROM PHYSICAL ATTACK filed Nov. 20, 2017, the contents of which is expressly incorporated by reference in its entirety.

TECHNICAL FIELD

The present technology pertains to network cameras, and more specifically to protecting recorded data from physical attacks.

BACKGROUND

Video camera systems can record audio and video in a surrounding area, which users can analyze to monitor and analyze events captured by the recorded audio and video, such as crimes and security events. Captured events in the recorded audio and video can be analyzed in real-time in order to monitor the surrounding area, or at a later time to review the events that transpired in the surrounding area over a period of time. Video camera systems can include networking capabilities to communicate with other devices over the network. The networking capabilities allow users to control the video camera systems over the network and receive the recorded audio and video over the network and remotely monitor the surrounding area or review captured events. Video camera systems can also include audio and video processing capabilities to perform monitoring and detection operations, such as human detection, facial recognition, motion detection, etc. Such processing capabilities allow video camera systems to better monitor and detect specific conditions of interest, human activity and identification, for example. The various recording and processing capabilities of video camera systems make such systems effective tools for deterring crime, protecting humans and property, and investigating events.

Unfortunately, video camera systems are often exposed to the criminal and environmental elements involved in destructive or criminal activity, which is typically of interest to those implementing the video camera systems. Consequently, video camera systems can be susceptible to damage from the criminal and environmental elements responsible for such destructive or criminal activity. For example, criminals may attempt to damage any video camera systems in the area to prevent being captured or identified in a criminal act. Similarly, natural events, such as fires or floods, do not spare video camera systems from their associated destruction. Moreover, it is very difficult to protect video camera systems and their recorded data from damage by criminals or natural events. Yet the recorded data prior to and during such events can be significantly valuable to those attempting to understand and reconstruct these events.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5B illustrates an example diagram for intelligent motion or object detection in video segments;

DESCRIPTION OF EXAMPLE EMBODIMENTS

Figure 1:
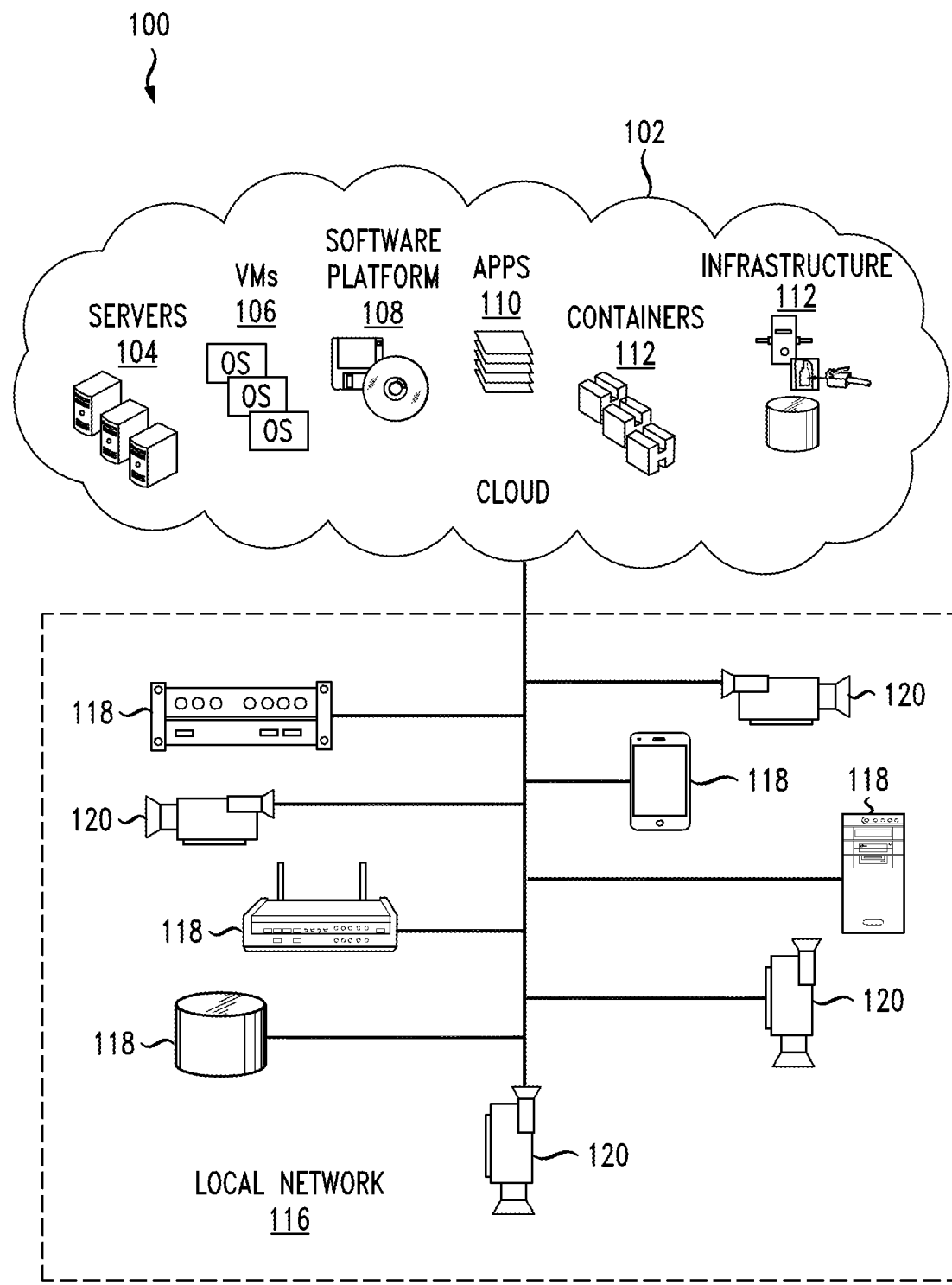
FIG. 1 illustrates an example camera and video management environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for protecting critical camera data from physical attack. In some examples, a camera at a particular site can monitor data captured by the camera at the particular site. The camera can record the data at the particular site and store the recorded data in an onboard storage at the camera. The data can include video content (e.g., frames, video clips, video segments, video files, etc.), image content, sensor data, audio content, etc.

Based on the data captured by the camera, the camera can detect one or more predetermined conditions indicating a threat to the camera. For example, the camera can analyze the data captured by the camera, including the content within the data and any associated metadata, to detect conditions captured in the data by the camera which indicate a threat to the camera (e.g., destruction threat, physical attack, data loss, etc.). Based on the one or more predetermined conditions indicating the threat to the camera, the camera can determine a threshold risk of damage to data stored at the camera. For example, the camera can determine if the threat poses a threshold risk of data loss to the data stored at the camera, including data captured, recorded, and stored at the camera such as video, image, audio, and/or sensor content.

In response to determining the threshold risk of damage to the data stored at the camera, the camera can select, from a plurality of content items (e.g., video files, video segments, video clips, video frames, images, audio, sensor data, etc.) in the data stored at the camera, a subset of content items based on respective priorities associated with the plurality of content items, and send, via a network, the subset of content items to one or more destinations to yield a prioritized backup of the subset of content items and/or the plurality of content items. In some examples, the network can be a local network and the one or more destinations can include a device on the local network, such as a camera or server on the local network, and/or a remote destination such as a cloud. The camera can send the subset of content items in a prioritized fashion until the subset of content items have been transmitted to the one or more destinations or the camera encounters damage or data loss. If the camera completes the sending of the subset of content items, it can continue sending other subset(s) of content items from the plurality of content items stored at the camera based on the respective priorities. The camera can thus offload data stored at the camera in a prioritized fashion to preserve (i.e., backup) as much higher priority data before encountering damage or data loss from the threat (e.g., an attack, a natural disaster, etc.).

Description

As previously mentioned, video camera systems and their associated data can be vulnerable to damage and destruction from criminals and natural events, such as floods or fires. Destruction of the video camera systems and their associated data results in loss of video and data recording such events. However, such video and data can be very valuable to those attempting to reconstruct the events and identify pertinent information.

The disclosed technology addresses the need in the art for effective and intelligent protection of data recorded by camera systems. The present technology involves system, methods, and computer-readable media for protecting critical data on cameras from physical attacks. The disclosed approaches allow data from video camera systems to be backed up and protected before and during such events. Various prediction and detection triggers and factors can be implemented to fast-track backups of camera data to secure locations, to guard against possible camera data destruction. Given the time constraints that are common during such events, the data can be backed up or secured in a prioritized manner. For example, camera data can be transmitted to a secure location in a prioritized manner which transmits high priority data first and continues with lower priority data until all data has been backed up or damage to the video camera system prevents further transmission of data. Network parameters can also be adjusted to prioritize the network transmission of specific data identified as having higher priority during a backup procedure.

A video camera system can implement one or more detection and analysis functions to predict when the video camera system may be at risk of damage that may result in loss of data. Non-limiting examples of detection and analysis functions can include camera tamper detection, such as blocking, re-positioning, focus changes, impact sensing, human detection, emotion detection, object-in-hand detection, sound classification, etc. The detection and analysis functions can predict or detect various types of attacks or impacts, such as an impact from a brick, rock, hammer, baseball bat, bullet, etc.

Upon detecting a possible risk of damage, a video camera system can immediately offload the highest priority video files to other devices, such as nearby devices on the local network or remote devices via the Internet. In some cases, the destinations for backing up data can be identified or surveyed in advance. The video camera system can also alert one or more devices of the detected risk. To facilitate transmission of backup data before or during an event, changes in the network or network parameters, such as quality-of-service (QoS) parameters, can be implemented on the network to prioritize transmission of the backup video files and/or allocate bandwidth to such backups.

Prioritization schemes for video files can vary based on the specific application or context. For example, an administrator of the video camera system can determine in advance what types of video files or file characteristics should be given highest priority for the particular application associated with the video camera system. Other configurations and/or rules-based prioritization procedures can also be implemented for intelligently determining priorities of backup data. For example, in some cases, default rules may that the most recent files and/or files capturing events, activities, or motion should be given highest priority. Such prioritization can result in preservation of as much of the video leading up to the destruction of the camera as possible, which is often the video of highest interest to those examining such events.

If a camera is struck by an object but not destroyed on first impact, the camera can use onboard sensors to detect the event and even feign death to trick vandals into thinking the camera has been destroyed. The camera can feign death by turning off indicator lights, playing audio indicating the camera is no longer recording, re-positioning the lens away from the attacker, etc. In the event of a false alarm or false positive, the backed up data can be optionally deleted. For example, the backup data can be deleted after certain criteria is met, such as a lapse of time, a user confirmation of the false alarm or false positive, an administrator check, etc.

FIG. 1 illustrates an example camera and video management environment 100. A local network 116 can include cameras 120 and computing devices 118 configured to communicate with each other over the local network 116. The computing devices 118 can include any network-capable devices, such as laptops, phones, access points, switches, servers, televisions, network storage systems (SANs), tablet computers, kiosks, Internet of things (IoT) devices, etc. The cameras 120 can include one or more types of cameras with networking and data storage capabilities.

The cameras 120 can be setup in various locations to capture and record/store data from their respective locations. The cameras 120 can record video and audio and store the recorded video and audio locally and/or transmit the recorded video and audio to other devices for storage, monitoring, analysis, etc. The cameras 120 can communicate with each other over the local network 116, as well as other devices. For example, the cameras 120 can probe each other for data, conditions, management, etc. As another example, the cameras 120 can communicate with one or more of the devices 118 to transmit recorded data and/or receive management instructions.

The local network 116 can be communicatively coupled to one or more remote networks, which in this example is represented by cloud 102. It should be noted that the one or more remote networks are not limited to cloud networks or environments. The cloud 102 is illustrated herein for clarity and explanation purposes, as other types of networks and network environments are also possible and contemplated herein.

The cameras 120 and devices 118 can communicate with the cloud 102 via the local network 116. In this example, the cloud 102 can include one or more private, public, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc. In some cases, the infrastructure nodes 114 can include a controller for managing the cameras 120 and/or local network 116.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), cloud-based management services, and other types of services such as desktop as a service (DaaS), information technology management as a service (ITaaS), managed software as a service (MSaaS), mobile backend as a service (MBaaS), etc.

In some cases, the cameras 120 can communicate with the cloud 102 to backup data to the cloud 120, receive management instructions from the cloud 102, obtain software and/or configuration updates, send or receive alerts, etc. The cloud 102 can also send management instructions to the local network 116 to manage network communications, bandwidth, workloads, and/or parameters, such as quality-of-service (QoS) parameters, class-of-service (CoS) parameters, bandwidth and/or resource allocation instructions, etc., which can be used for prioritization of camera data as further described below.

The cameras 120 and devices 118 can communicate with the cloud 102, including elements 104-114, via one or more public networks (e.g., Internet), private networks, and/or hybrid networks. For example, in some cases, the cameras 120 can communicate with the cloud 102 via a virtual private network (VPN) or tunnel between the cameras 120 on the local network 116 and the cloud 102.

Figure 2:
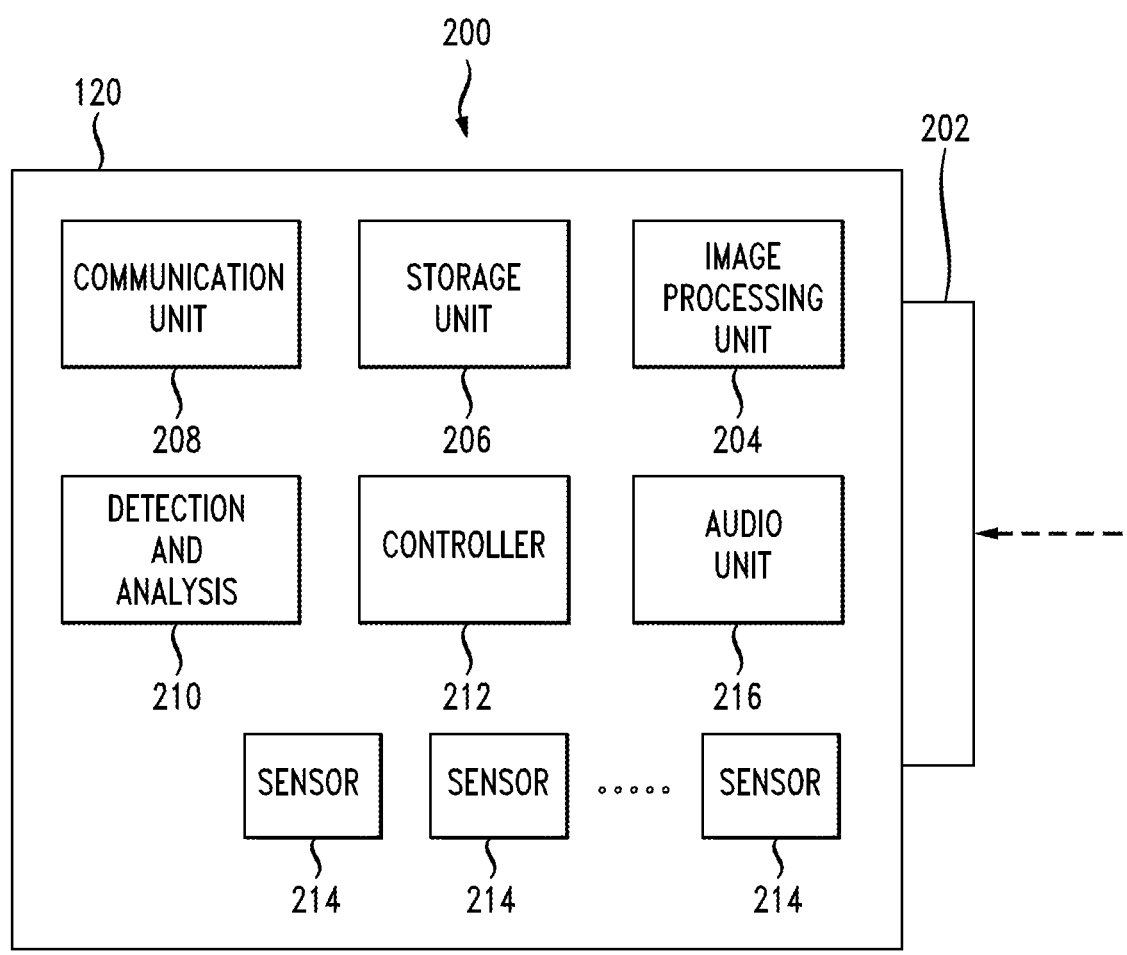
FIG. 2 illustrates an example camera system.

FIG. 2 illustrates an example architecture 200 of an example camera system 120. The architecture 200 can include a lens 202 for capturing video and images. The lens 202 can include an image sensor. In some cases, the lens 202 can include various adjustment parameters, such as tilt, rotation, pan, focus, field of view, etc. The lens 202 can also include other imaging parameters, such as aperture, image quality parameters, zoom parameters, shutter speed, etc.

Image and video data captured by the lens 202 can be provided as input to other components in the camera system 120, such as the image processing unit 204 and the detection and analytics unit 210. Image processing unit 204 can provide one or more image and video processing capabilities based on the input from the lens 202. For example, the image processing unit 204 can process input signals to generate frames of pixels and process the frames to enhance the image content. The image processing unit 204 can also perform other image and video processing capabilities such as, for example, video encoding/decoding, filtering, pixel correction, enhancement, focusing, brightness adjustment, etc.

The architecture 200 can include sensors 214 for detecting various signals and conditions, such as image sensors, motion sensors, noise sensors, light sensors, CMOS sensors, flame detection sensors, proximity sensors, biosensors, machine vision sensors, video sensors, smart scene sensors, tracking sensors, speech recognition sensors, multimodal sensors, hall effect sensors, speed sensors, smoke sensors, metal detector sensors, explosive detection sensors, impact sensors, shock sensors, pressure sensors, moisture sensors, heat sensors, position sensors, tilt sensors, air flow sensors, chemical sensors, gyroscopes, accelerometers, etc. The sensors 214 can include hardware and/or software sensors, as well as other components such as processors, memory, etc.

The architecture 200 can also include one or more audio units 216. The audio units 216 can include audio speakers, microphones, audio signal processing elements, etc. The audio units 216 can capture and detect sound, and determine sound characteristics, such as source, localization, intensity, timing cues, spectral cues, patterns, etc. For example, the audio units 216 can include one or more microphones to detect audio and can include logic to recognize the audio (e.g., human, environmental, etc.), recognize the level or intensity of the audio, identify the location or origin of the audio, identify the direction and distance of the audio, recognize speech, recognize specific types of sounds, etc.

Data calculated or collected from the sensors 214 and audio unit 216 can be provided to the detection and analysis unit 210, which can implement such data along with image and/or video data to detect specific characteristics or conditions in the content of any of the captured data, detect objects and events, and perform other detection operations.

For example, the detection and analysis unit 210 can analyze various aspects of the captured data, such as pixels, frames, sound, images, frame sequences, sensor data, etc., to perform detection operations. Non-limiting examples of detection operations can include tamper detection, blocking (i.e., blocking of the lens 202), re-positioning (i.e., camera and our lens re-positioning), focus changes, impact detection, human detection, emotion detection, object-in-hand detection, sound classification, facial recognition, label detection, shot change detection, video segmentation, object recognition, motion detection, event detection, lighting detection, smart scene detection, smoke detection, etc.

The storage unit 206 can include one or more storage or memory devices for storing captured data, such as video and image data recorded by the camera system 120, metadata associated with the recorded data, sensor data, recognition data, etc. The storage unit 206 can include one or more solid state storage devices, disk storage devices, and/or any type of storage or memory devices.

The communications unit 208 can include one or more network interfaces for communicating with other devices over a network, such as local network 116. The communications unit 208 can include wireless and/or wired network interfaces. For example, in some cases, the communications unit 208 can include a wireless network interface card for communicating with other devices via a wireless network (e.g., WIFI). The camera system 120 can send and receive data to and from network devices via the communications unit 208.

The controller 212 can include rules, policies, logic, instructions, etc., to manage backup operations of data in the storage unit 206. The backup operations can include prioritizing data to be backed up from the storage unit 206, trigger the backup operations based on one or more factors (e.g., damage risk factors or levels), timing of the backup operations, selection of backup destinations, etc. The controller 212 can process the storage data, detected conditions, stored rules and settings, and other factors to determine when to backup data, which data to backup, where to backup the data, how to prioritize the transmission of data, determine when to trigger a backup, etc. The controller 212 can also include rules or instructions for communicating with other devices as part of a determination for when to trigger a backup, where to transmit data in a backup, etc., as further described below. The controller 212 can also coordinate with the network and other devices the backup of the data and the network parameters for transmitting data being backed up.

The components in architecture 200 described herein are non-limiting examples provided for clarity and explanation purposes. It should be noted that other configurations can include more or less components, including components that are not illustrated in architecture 200 but would be recognized by one of skill in the art.

Figure 3:
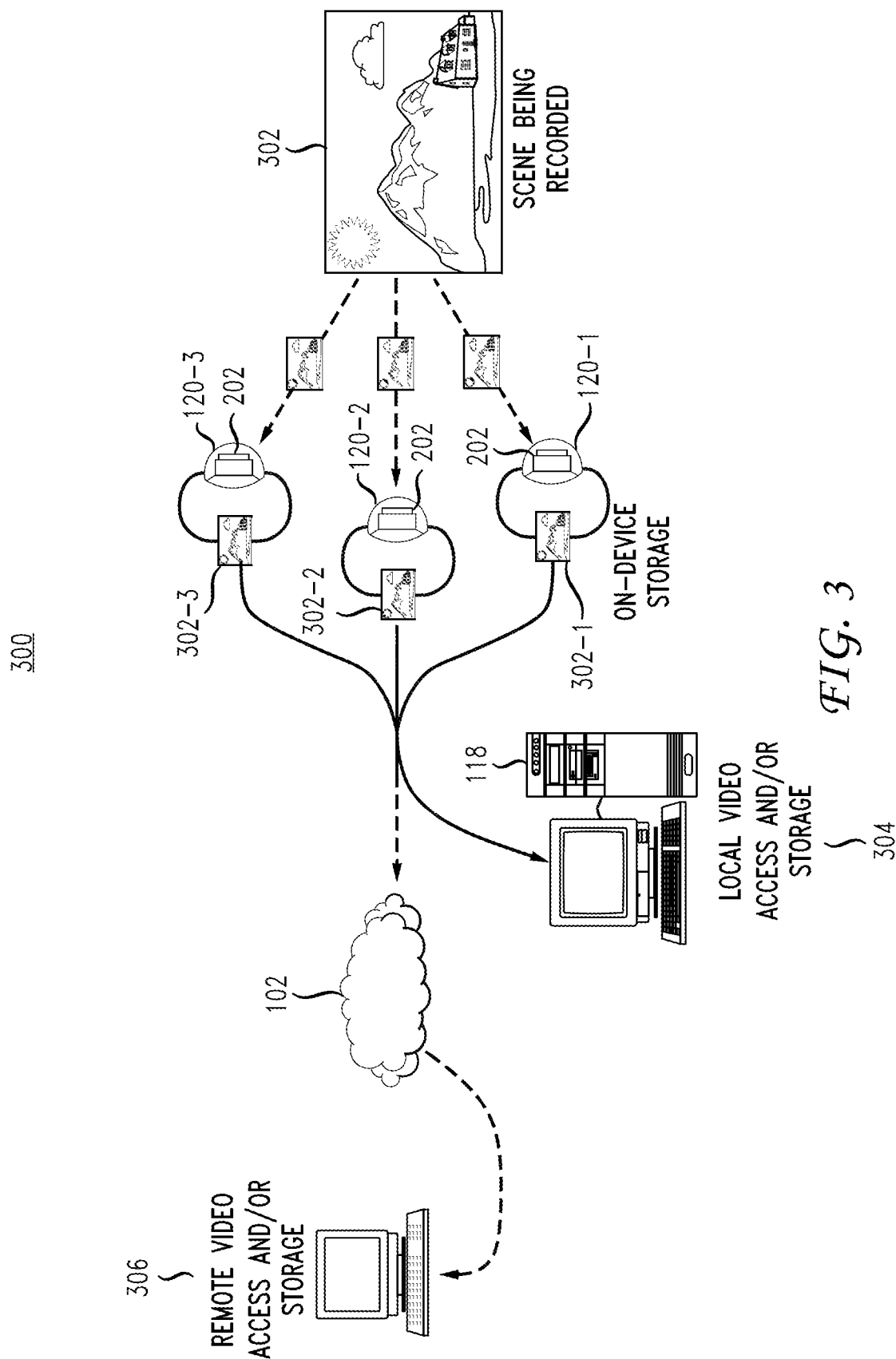
FIG. 3 illustrates an example diagram for capturing and monitoring video in an example video camera environment.

FIG. 3 illustrates an example diagram 300 for capturing and monitoring video in an example video camera environment, such as camera management environment 100. In this example, camera systems 120-1, 120-2, 120-3 are capturing and recording a scene 302 via their respective lenses 202. Depending on their respective field of views and positions, the scene 302 captured by the camera systems 120-1, 120-2, 120-3 can be the same scene or different, respective scenes. In some cases, the scene 302 can be the same scene captured from different perspectives by the camera systems 120-1, 120-2, 120-3 based on one or more factors associated with the camera systems 120-1, 120-2, 120-3, such as respective positions or locations, respective angles, respective proximities, respective camera settings, etc. For explanation purposes, the examples below will describe the scene 302 as the same scene captured from the camera systems 120-1, 120-2, 120-3.

The camera systems 120-1, 120-2, 120-3 can capture the scene 302 and store respective recorded data 302-1, 302-2, 302-3 locally at the camera systems 120-1, 120-2, 120-3 (e.g., storage unit 206). The recorded data 302-1, 302-2, 302-3 can include raw and/or processed image or video data, such as pixels and frames; metadata, such as timestamps, tags, classification information, labels, file or content descriptions, file information, frame information, titles, etc.; sensor data captured by the camera systems 120-1, 120-2, 120-3 as part of the recording; etc.

The camera systems 120-1, 120-2, 120-3 can store the recorded data 302-1, 302-2, 302-3 locally on their respective storage (e.g., storage units 206) as previously mentioned, and/or transmit the recorded data 302-1, 302-2, 302-3 to one or more nodes 118 and/or cloud 102. For example, the camera systems 120-1, 120-2, 120-3 can transmit the recorded data 302-1, 302-2, 302-3 to a node 118 on the local network 116 for local storage or display 304 at the node 118, and/or to cloud 102 for remote storage or display 306 at cloud 102.

In some cases, the camera systems 120-1, 120-2, 120-3 can transmit the recorded data 302-1, 302-2, 302-3 to node 118 and/or cloud 102 as a video feed for local display at the node 118 and/or remote display at cloud 102. The cloud 102 can also receive such a video feed and provide the video feed for access (e.g., display) by other devices over a network, such as the Internet. For example, the cloud 102 can receive the video feed and allow other devices to stream the video feed from the cloud 102 for presentation at the devices. Thus, users can access the video feed on the cloud 102 from any device and monitor the scene 302 being recorded by the camera systems 102-1, 120-2, 120-3.

Figure 4A:
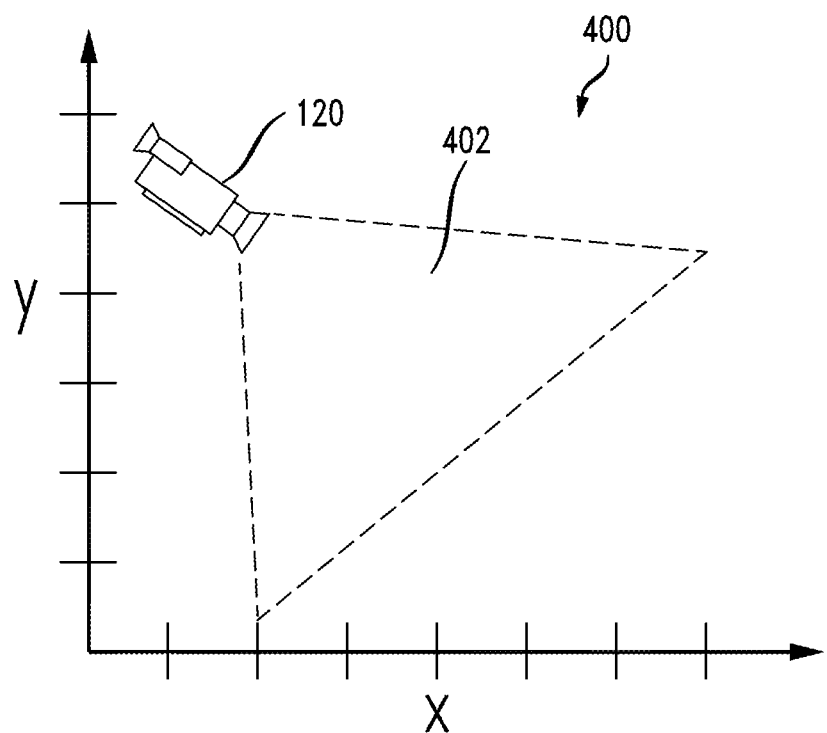
FIG. 4A illustrates an example diagram of a field of view of a camera.

FIG. 4A illustrates an example diagram 400 of a field of view 402 of a camera 120. The field of view 402 illustrates how much of a scene can be seen or captured by the camera 120. The field of view 402 can include a view depth, width, angle, height, etc. The field of view 402 can depend on various factors, such as the angle of the camera, the lens of the camera, the aperture of the camera, the focus of the camera, the zoom settings of the camera, etc.

For example, a narrow field of view may result when the camera is zoomed in, and may only show a small part of a scene (e.g., the door entrance to a room). On the other hand, a wide field of view may result when the camera is zoomed out, and may show a larger part of the scene (e.g., the entire room in addition to the door entrance).

Figure 4B:
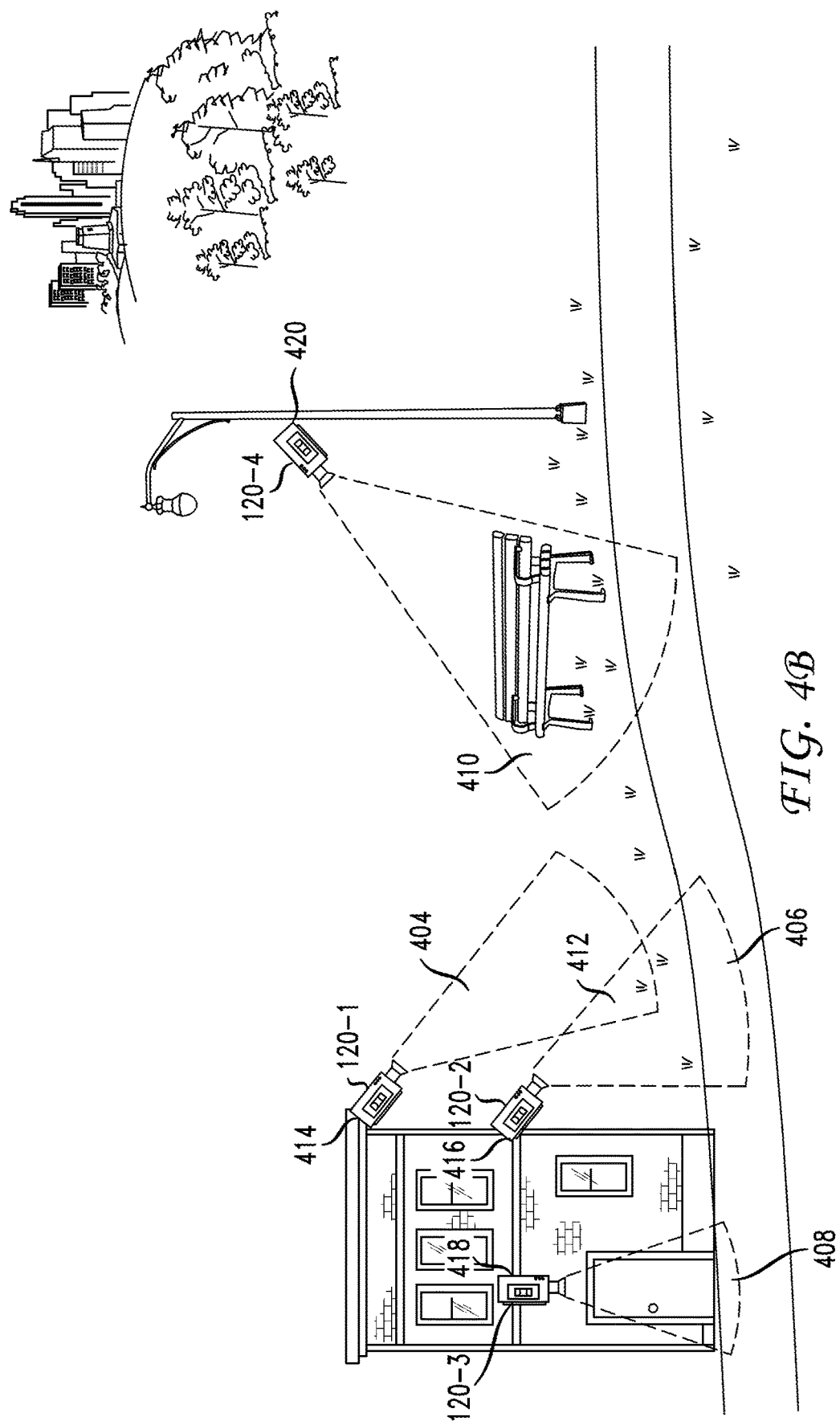
FIG. 4B illustrates an example placement of cameras at a particular site.

FIG. 4B illustrates an example placement of cameras in a particular site. In this example, camera systems 120-1, 120-2, 120-3, 120-4 are positioned on different locations 414, 416, 418, 420 in a site to capture different scenes at the site. For example, camera system 120-1 is located at a second floor location 414 of a building, which allows the camera system 120-1 to capture and record video within the field of view 404 of the camera system 120-1 from the second floor location 414.

Camera system 120-2 is located at first floor location 416 on a side of the building, which allows the camera system 120-2 to capture and record video within the field of view 406 of the camera system 120-2 from the first floor location 416.

Camera system 120-3 is located on a front door location 418 of the building, which allows the camera system 120-3 to capture and record video within the field of view 408 of the camera system 120-3 from the front door location 418.

Camera system 102-4 is located on a light post location 420 which allows the camera system 120-4 to capture and record video within the field of view 410 of the camera system 120-4 from the light post location 420.

As illustrated, camera systems 120-1, 120-2, 120-3, 120-4 can capture different angles, areas, objects, etc., of a site based on their respective locations 414, 416, 418, 420 and field of views 404, 406, 408, 410. In some configurations, the field of view of two or more camera systems may overlap. For example, field of view 404 of camera system 120-1 can overlap with field of view 406 of camera system 120-2 to yield an overlapping area of coverage 412. The overlapping area of coverage 412 can be useful to capture different angles and perspectives of the same area.

The overlapping area of coverage 412 can also allow the camera systems to capture and record multiple copies of video pertaining to the overlapping area of coverage 412. Thus, if the video recording from one camera system is damaged or deleted, the user may still have a copy of video recorded for the overlapping area of coverage 412 based on the video recording from the second camera.

Because the field of views 404 and 406 of camera systems 120-1 and 120-2 provide an overlapping area of coverage 412, both camera systems 120-1 and 120-2 can detect conditions, events, objects, threats, etc., that take place within the overlapping area of coverage 412. Thus, when detecting a condition, event, object, threat, etc., pertaining to the overlapping area of coverage 412, the camera systems 120-1 and 120-2 can communicate with each other to verify, enhance, or compare detection results. The different angles and/or perspectives provided by the camera systems 120-1 and 120-2 can help when performing a detection operation pertaining to the overlapping area of coverage 412.

For example, camera system 120-1 may detect a human within the overlapping area of coverage 412. However, given the position 414 and/or field of view 404 of the camera system 120-1, the human detection result may be assigned a low probability, suggesting a level of uncertainty by the camera system 120-1. Given the low probability, the camera system 120-1 may communicate with camera system 120-2 to verify its human detection result. If camera system 120-2 also detects the human after performing a human detection operation, the camera system 120-1 can obtain added certainty or verification for its human detection results. If the human detection result of camera system 120-2 has a high probability, camera system 120-1 can significantly increase the likelihood that the human detection result obtained by camera system 120-1 is indeed correct.

As previously mentioned, the camera systems 120-1 and 120-2 can also compare their detection results to obtain an enhanced detection based on the combination of detection results. For example, if one camera system detects x number of attributes for an object or view of the overlapping area of coverage 412 and another camera system detects y number of attributes for the object or view, the camera systems can combine their captured data to enhance their detection results and increase the number of attributes detected for the object or view.

As illustrated in this example, multiple camera systems can be configured to overlap coverage in certain areas, such as high incident or value areas, and/or maximize the overall coverage at the site. Overlapping coverage can be used to obtain backup or multiple recordings, and perform cross-checking and verification of capture and detection results. Data captured for non-overlapping areas can also be combined to provide a greater overall view or depiction of a site and/or detection results for one or more areas in the site. For example, one camera system may capture a criminal event from a human, while another camera may capture the event(s) leading up to the criminal event. To illustrate, one camera system may capture the crime and another camera system may capture a fleeing direction of the criminal. The data captured, and intelligence ascertained, from the non-overlapping areas of coverage of the two camera systems can be combined to enhance the overall understanding of the event and/or detection operations associated with the event.

Figure 5A:
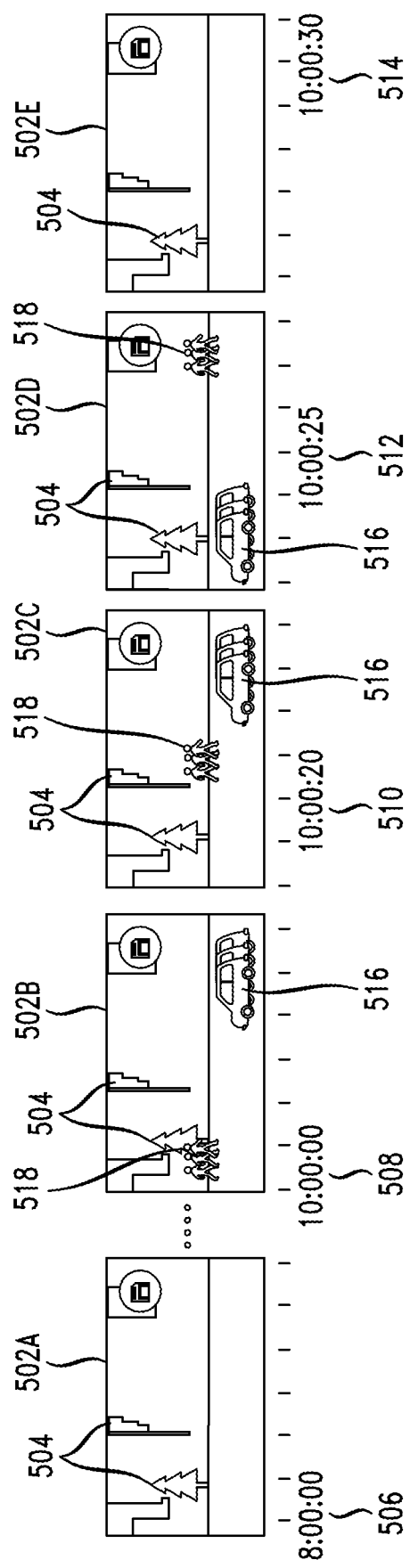
FIG. 5A illustrates example video recording frames capturing a scene recorded at various times.

FIG. 5A illustrates example video recording frames 502A-E capturing a scene recorded at various times 506, 508, 510, 512, 514. Frame 502A illustrates the scene recorded at a first time 506, which is 8:00:00 in this example. Frame 502A captures static objects 504 at the scene, with no events or moving objects detected in the frame 502A.

Frame 502B illustrates the scene recorded at a second time 508, which is 10:00:15 in this example. Frame 502B therefore captures the scene two hours and fifteen seconds after frame 502A. Like frame 502A, frame 502B also captures the static objects 504. However, in addition, frame 502B also captures a human 518 and car 516. The human 518 and car 516 in frame 502B are moving towards each other.

Frame 502C illustrates the scene recorded at a third time 510, which is 10:00:20 in this example. Frame 502C therefore captures the scene five seconds after frame 502B. Like frames 502A and 502B, frame 502C also captures the static objects 504. Frame 502C also captures the human 518 and car 516 moving towards each other. However, in frame 502C, the human 518 and car 516 appear closer to each other than in frame 502B. Thus, frames 502B and 502C indicate that the human 518 and car 516 moved closer towards each other during the five seconds between frames 502B and 502C.

Frame 502D illustrates the scene recorded at a fourth time 512, which is 10:00:25 in this example. Frame 502D therefore captures the scene five seconds after frame 502C and ten seconds after frame 502B. Like frames 502A, 502B, and 502C, frame 502D also captures the static objects 504. Frame 502D also captures the human 518 and car 516. However, in frame 502D, the human 518 and car 516 appear to have moved past each other. Thus, frames 502C and 502D indicate that the human 518 was in front of the car 516 at 10:00:25, the human 518 and car 516 were moving toward each other and actually passed each other during the five seconds between frames 502C and 502D.

Finally, frame 502E illustrates the scene recorded at a fifth time 514, which is 10:00:30 in this example. Frame 502E therefore captures the scene five seconds after frame 502D, ten seconds after frame 502C, and fifteen seconds after frame 502B. Like frame 502A, frame 502E captures the static objects 504 but no events or moving objects.

When analyzed, frames 502A-E can depict an event involving the human 518 and the car 516 at specific times associated with the frames 502A-E. The frames 50A-E illustrate that the human 518 and car 516 had not crossed each other at 8:00:00, were initially captured at the scene moving towards each other at 10:00:15 in frame 502B, passed each other after ten seconds of moving toward each other, and were no longer within the scene by 10:00:30. If a user wants to review or identify an interaction between the human 518 and the car 516, the user would be able to focus on frames 502B-D which would capture the moment of the interaction as well as the moments before and after the interaction.

If a camera system needs to perform a backup of frames at the camera system, the camera system can prioritize backup of frames which capture activities or events, which in this example are frames 502B-D, as they have a higher likelihood of being of interest, and assign lower priorities to those frames which do not capture any activities or events, which in this example are frames 502A and 502E.

In some cases, the camera system may further prioritize the frames 502B-D based on additional factors or conditions associated with the activities or events captured by those frames. For example, when backing up frames associated with an event between the human 518 and car 516, the camera system can prioritize frames 502C and 502D over frame 502B, as frames 502C and 502D capture the moments closest in time to when the human 518 and car 516 crossed each other, which would have the highest likelihood of capturing the interaction between the human 518 and car 516. Once the camera system has completed backing up frames 502C and 502D, the camera system may then continue with a backup of frame 502B, which can be assigned a second-highest priority as it captures the human 518 and car 516 within the scene, albeit at an earlier moment. Finally, if the camera system completes backing up frame 502B and has additional time and space for additional backup of the remaining frames, the camera system can then backup frames 502A and 502E, which are designated a lowest priority and thus backed up last.

In a scenario where the camera system captures an event and determines that the camera system is at risk of damage from a threat associated with the event (e.g., such as a vandalism threat or a natural threat from a fire), the camera may not have enough time to perform a backup of all its captured data before becoming damaged by the source of the threat. In such cases, the prioritized backup of frames can allow the camera system to backup the most important or relevant frames prior to any damage. Once the backup has completed for the most important or relevant frames, any loss of data resulting from damage to the camera by the source of the threat may not be as significant, as it may not prevent the camera system from backing up the frames which capture the event and/or moments leading up to the event.

FIG. 5B illustrates an example diagram for intelligent motion or object detection in video segments. Here, video segment 520A and video segment 520B capture a scene recorded at a first time 522 and a second time 524, respectively 8:00 and 9:00, when a laptop computer 530 went missing. Video segment 520A depicts the laptop computer 530 on a desk 528 at the first time 522, and video segment 520B depicts the desk 528 without the laptop computer 530 at the second time 524. A camera system 120 can analyze an area 526 of interest within the scene captured by video segments 520A and 520B to detect the event causing the laptop computer 530 to go missing.

The camera system 120 can analyze multiple video segments capturing the area 526 of interest within the scene and zero-in on a particular event captured by video segments 520A and 520B. The camera system 120 can then prioritize video segments 520A and 520B as the highest priority segments associated with that particular event. The camera system 120 can tag, label, or otherwise associate the video segments 520A and 520B with a high priority for that particular event.

If the camera system 120 predicts a risk of damage and data loss, it can initiate a prioritized data backup which prioritizes backup and transmission of the video segments 520A and 520B over other video segments. The camera system 120 can perform a similar prioritization of other video segments to ensure the highest priority video segments are backed up first when there is a threat of damage. The camera system 120 can prioritize the overall video segments having the highest priority for one or more events detected by the camera system 120. In some cases, the camera system 120 can further prioritize high priority video segments for multiple events. For example, the camera system can store two video segments marked as high priority and associated with two different events. The camera system may further prioritize the two video segments to assign one segment a higher priority than the other based on one or more factors, such as event characteristics, quality, time of events, etc. For example, the camera system can prioritize video segments associated with the event perceived to create the risk of damage to the camera that triggered the backup, such as a current event detected and determined to create a risk of damage. As another example, the camera system can prioritize newer video segments from older video segments.

The camera system can then use the prioritization information to perform a prioritized backup triggered by a threat of damage. The prioritized backup can have multiple levels of prioritization, with multiple priorities assigned to different sets and various backup iterations performed according to the multiple levels of prioritization.

Figure 6:
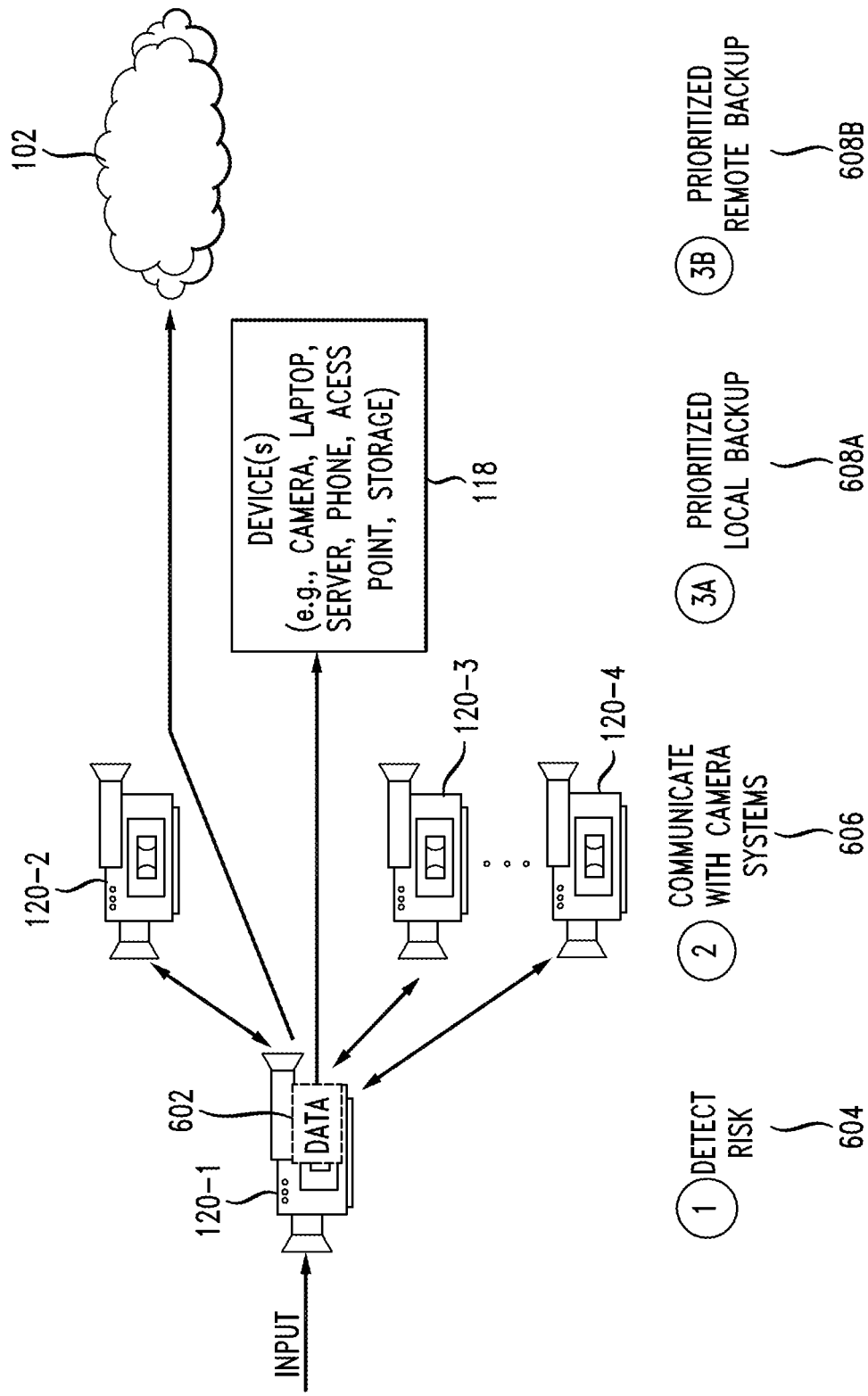
FIG. 6 illustrates an example diagram of a prioritized backup of video segments stored on a camera system in response to a detected risk.

FIG. 6 illustrates an example diagram of a prioritized backup of video segments stored on a camera system 120-1 in response to a detected risk. In this example, camera system 120-1 can store data 602 captured by the camera system 120-1 from while recording from a particular location. The data 602 can include image and video data, such as video frames, segments, files, etc., as well as other data such as audio, metadata, sensed data (e.g., motion, environmental conditions, objects, etc.). When the camera system 120-1 detects a risk 604 that has a threshold probability of causing damage to the camera system 120-1 and/or loss of the data 602, the camera system 120-1 can initiate a prioritized data backup procedure.

In some cases, the camera system 120-1 may first communicate 606 with one or more camera systems 120-2, 120-3, 120-4 on the local network, in order to verify the risk 604 with one or more of the other camera systems 120-2, 120-3, 120-4, or send the data 602 to one or more of the other camera systems 120-2, 120-3, 120-4 according to respective data priorities for storage at one or more of the other camera systems 120-2, 120-3, 120-4. For example, the camera system 120-1 can request from the camera systems 120-2, 120-3, 120-4 a risk assessment or verification, or relevant data captured by the camera systems 120-2, 120-3, 120-4. Camera systems 120-2, 120-3, 120-4 may have different perspectives of the event and thus may have event-related data or risk assessment information that can be used to verify, supplement, or contradict the risk 604 predicted by the camera system 120-1, or otherwise enhance the data used to predict or detect the risk 604.

If the camera systems 120-2, 120-3, 120-4 have event data or risk assessment information the camera system 120-1 and/or camera systems 120-2, 120-3, 120-4 can re-assess the risk based on the combined data and/or risk assessment information. If the re-assessment results indicate that the risk 604 was incorrectly detected (e.g., no risk exists, a risk exists but is below a threshold, etc.), the camera system 120-1 may determine not to perform a prioritized backup of the data 602. On the other hand, if the camera system 120-1 and/or camera systems 120-2, 120-3, 120-4 confirm the risk 604, the camera system 120-1 can continue with the prioritized backup. In some cases, the camera system 120-1 may first attempt to backup the data 602 on one or more other camera systems 120-2, 120-3, 120-4 in the local network. Whether to backup data at the one or more camera systems 120-2, 120-3, 120-4 in the local network can depend on one or more factors, such as urgency of backup, type of risk or event, physical location of the camera systems 120-2, 120-3, 120-4, etc.

For example, if the type of risk is vandalism from a human and one of the camera systems 120-2, 120-3, 120-4 is located in an area at the site that is not accessible by humans or having a low access probability for the current risk (e.g., based on the distance between the human and the camera, the location of the camera relative to the human, etc.), the camera system 120-1 may backup the data 602 to that camera system given the low probability that the human will be able to physically damage the camera system and backed up data. On the other hand, if the type of risk is fire and the camera systems 120-2, 120-3, 120-4 all are vulnerable to damage from the fire, the camera system 120-1 may decide not to backup the data 602 to any of the camera systems 120-2, 120-3, 120-4 given a high probability that the camera systems 120-2, 120-3, 120-4 and their stored data will also be damaged by the fire.

When performing the prioritized backup of the data 602, the camera system 120-1 can identify other storage destinations in addition to, or in lieu of, the camera systems 120-2, 120-3, 120-4. For example, the camera system 120-1 can identify one or more local devices 118 or the cloud 102 as potential storage destinations. The camera system 120-1 can then select the one or more local devices 118 and/or the cloud 102 as the backup destination for the data 602. The backup destination can be selected based on one or more factors, such as urgency (e.g., predicted amount of time until damage), network conditions (e.g., bandwidth, congestion, connectivity, latency, etc.), threat type (e.g., localized threat, site-wide threat, device-specific threat, etc.), size of data backup, etc.

In some cases, the camera system 120-1 can decide to perform a prioritized local backup 608A of the data 602. For example, if the backup is urgent (e.g., the predicted amount of time until damage very small) and/or the threat is localized to either the camera system 120-1 or a subarea of the site where the camera system 120-1 is located, the camera system 120-1 can select to perform a prioritized local backup 608A to one or more devices 118 on the local network (e.g., local network 116). The one or more devices 118 can be selected from within the local network based on a proximity to the threat or a security level predicted for the one or more devices 118 vis-à-vis the particular threat. The one or more devices 118 can include a server, a network area storage system, a backup disk, a camera system, or any other computing device having available storage.

In some cases, the camera system 120-1 can select to perform a prioritized remote backup 608B of the data 602. For example, if the threat applies to the entire physical location, a device on the local network with a risk below a threshold is not identified, a predicted amount of time until damage is above a threshold, a local device having the storage or resources necessary for a local backup, or the network conditions are above a threshold for a remote backup, the camera system 120-1 can select to perform a prioritized remote backup 608B to the cloud 102. The cloud 102 can provide a safer destination than the local network but may carry a higher latency and thus decrease the amount of data that can be backed up within a period of time. These factors can be balanced when selecting the storage destination. The camera system 120-1 can also communicate with the cloud 102 prior to performing a backup to the cloud 102 to request help from the cloud 102 in selecting the destination or configuring the local network to prioritize network traffic associated with the backup. Since the cloud 102 can include additional processing resources, it can help quickly and precisely process the various factors in making a decision and managing the backup process.

In some examples, the camera system 120-1 can perform a hybrid backup process where it sends part of the data to a local destination and another part of the data to the cloud 102. For example, the camera system 120-1 can first backup the most urgent or critical data to a local destination that is further away from the risk, and then backup that same data to the cloud 102 for more permanent or secure storage. As another example, the camera system 120-1 may backup the most urgent or critical data to the cloud 102 where it is more secure, and switch to a local destination once the most urgent or critical data has been backed up to the cloud 102 in order to backup lower priority data to the local destination having a higher risk of damage than the cloud 102 but lower risk than the camera system 120-1. As yet another example, the camera system 120-1 may begin a prioritized remote backup 608B to the cloud 102 and during the backup determine that the urgency of the backup has changed based on changing characteristics of the risk or threat, such as amount of time predicted until loss of data, and thereafter switch to a prioritized local backup 608A to a local destination having lower latency or higher likelihood of completion before damage.

Figure 7:
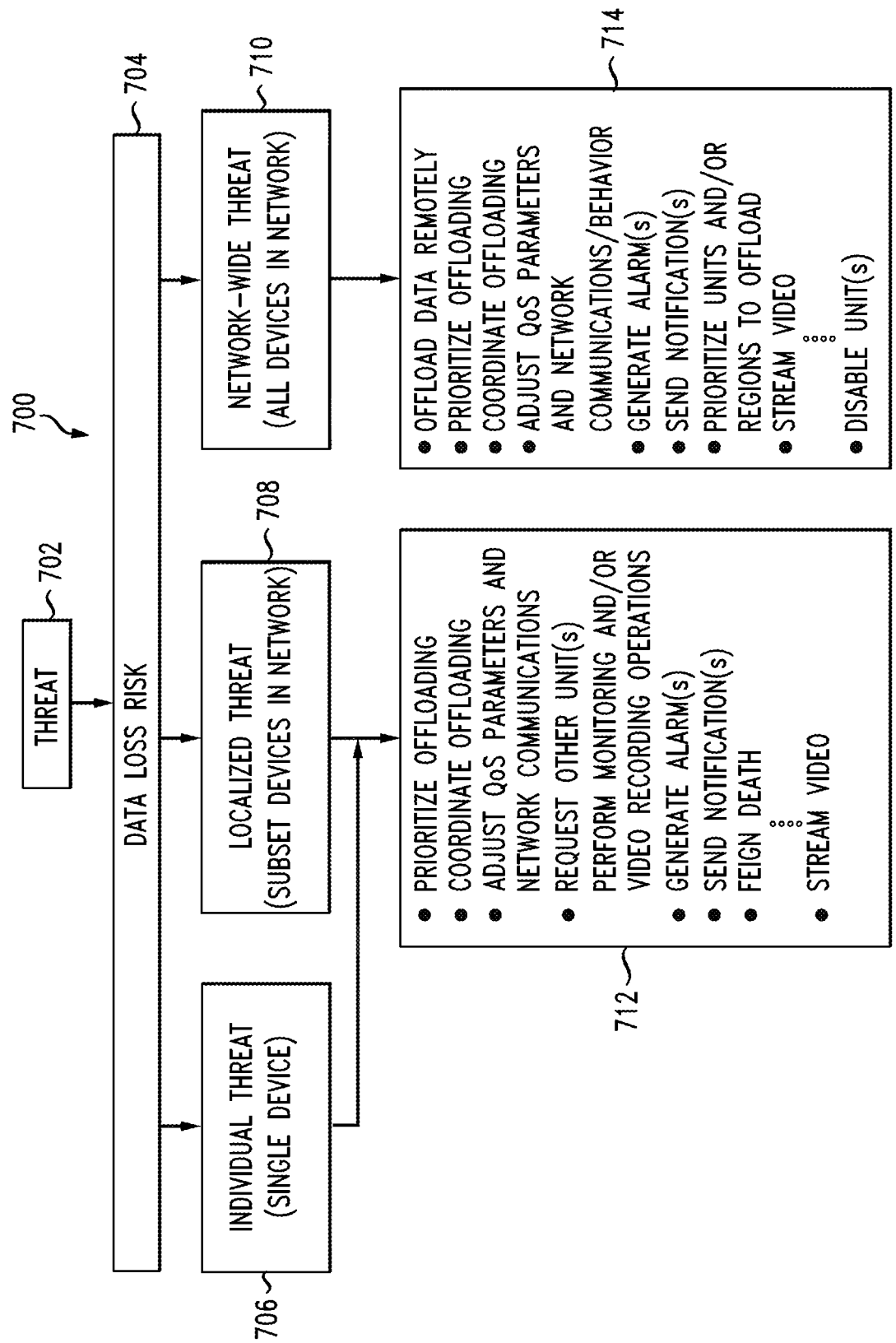
FIG. 7 illustrates an example flowchart for detecting threats and performing prioritized backups of recorded data stored on a camera system.

FIG. 7 illustrates an example flowchart 700 for detecting threats and performing prioritized backups of recorded data stored on a camera system. The camera system 120 detects a threat 702 and determines the data loss risk 704 of the threat 702. The camera system 120 detects the threat 702 by analyzing data collected by the camera system 120, such as video or image data captured by one or more lenses on the camera system 120, audio data captured by one or more audio sensors (e.g., microphones) on the camera system 120, and sensor data captured by one or more sensors on the camera system 120, such as sensors 214.

The camera system 120 can also analyze other data when detecting the threat 702, such as context information, such as environment information, location information, site information, etc.; data statistics, such as previous threats or incidents, previous risk assessments, previous false-positives, previous events, etc.; data collected from other devices, such as Internet data (e.g., news, alarms, environmental information, police reports, etc.), data from other devices (e.g., threats detected by nearby devices, conditions captured by other devices, risk assessments from other devices, etc.), machine learning information from other devices, etc.; site information, such as topology information, blueprint or building schematics, geography data, etc.; and so forth.

To detect the threat 702, the camera system 120 can perform one or more detection operations, such as facial recognition, human detection, event detection, tampering detection, impact sensing, camera or lens blocking detection, camera or lens re-positioning detection, camera focus changes, emotion detection, object-in-hand detection, sound classification and/or localization, camera scope of view changes, motion detection, object or shape detection, shock detection, human identity detection, speech recognition, proximity detection, label detection, video segmentation, etc. Such detection operations can be performed based on data collected and/or captured by the camera system 120, including video frames or segments, images, audio, location information, sensor data, etc.

The camera system 120 can compare detected information with predetermined factors to determine the threat 702. The predetermined factors can include specific factors defined for different types of threats, such as tampering threats, natural threats (e.g., fires, floods, tornadoes, etc.), and so forth. For example, predetermined factors can be defined for determining a natural threat such as a fire, flood, tornado, etc. Non-limiting examples of factors defined for a natural threat can include a temperature threshold (e.g., high temperatures can indicate a fire), smoke detection threshold, an amount of air flow, an amount and/or type of particles or chemicals in the air, an amount of moisture detected (e.g., moisture can indicate a flood, tornado, or weather event), an amount and/or type of motion detected (e.g., motion can be used as a factor to determine an earthquake), alarms or notifications from nearby systems or entities (e.g., weather alert or warning), etc.

As another example, predetermined factors can be defined for a human threat. Non-limiting example factors considered when ascertaining a human threat can include objects carried by the human (e.g., weapon, brick, hammer, etc.), human emotions detected for a human (e.g., anger, stress, fear, sadness, joy, surprise, disgust, anticipation, shame, calmness, excitement, etc.), human activity (e.g., running, fighting, hiding, etc.), human gestures (e.g., aggressive gestures, friendly gestures, erratic gestures, hand gestures, object motions, etc.), human identities (e.g., known criminals or vandals, wanted person, etc.), interactions between humans (e.g., confrontations, loitering, congregating, etc.), noise generated by a human (e.g., yelling, etc.), speech by a human (e.g., speech content, speech tone, speech patterns, pitch, voice level, voice attributes, etc.), and so forth. Human characteristics and factors related to human threat determination can be determined through, for example, facial recognition, speech recognition, detection, etc. For example, facial recognition analysis can review various parts of a human's face to determine characteristics such as smiling or frowning, eyebrow movement, nostril flaring, eye movement, etc.

The camera system 120 can run a machine learning algorithm to determine the threat 702 based on data collected by the camera system 120. The camera system 120 can also be trained based on different data and/or predetermined factors for threat detection. The camera system 120 can also be trained based on statistics collected for a number of camera systems and events. For example, the camera system 120 can be trained based on factors identified over a period of time from a number of camera systems that encountered threats resulting in damage and/or data loss. To illustrate, the camera system 120 can be trained based on a collection of factors ascertained from 10,000 camera systems that were destroyed by a respective event. The camera system 120 can then incorporate these factors and intelligence into its threat detection algorithm. The camera system 120 can also obtain feedback from other devices, such as nearby camera systems and/or the cloud.

Based on the threat 702, the camera system 120 can determine a data loss risk 704. The data loss risk 704 can be determined based on a predetermined threshold associated with the threat 702, a type of threat, user preferences, etc. In some cases, certain threats can be assumed to create a sufficient data loss risk to trigger a prioritized backup procedure. In other cases, certain threats may not necessarily be assumed, without more, to create the data loss risk set to trigger the prioritized backup procedure but may be indicative of a risk which can be weighed based on one or more factors associated with the threat 702 and/or related data and conditions. For example, certain threats can be classified as creating a certain risk but other factors may be necessary to raise the risk from the baseline risk for that threat to a threshold risk that would trigger a prioritized backup.

If the risk 704 exceeds or satisfies a threshold, the camera system 120 can initiate a prioritized backup of its data. If the camera system 120 has a pre-configured destination for the prioritized backup, the camera system 120 can initiate the backup to that destination. However, in some cases, the camera system 120 can intelligently select one or more destinations for the backup based on the threat 702, the risk 704, as well as other factors. In this example, the camera system 120 can select a backup destination and/or procedure based on one or more factors associated with the threat 702 and risk 704, such as whether the risk of damage is individual to the camera system 120, localized within an area of the site or local network, or applies to all devices in the site or local network.

Thus, in this example, the camera system 120 can determine if the threat 702 and/or risk 704 is an individual threat/risk 706 limited to the camera system 120, a localized threat/risk 708 pertaining to a subset of devices or areas associated with the local network, or a network-wide threat/risk 710 that applies to all devices, areas, and/or portions of the network and/or site.

The camera system 120 can determine if the threat 702 and/or risk 704 is an individual threat/risk 706, a localized threat/risk 708, or a network-wide threat/risk 710 based on one or more factors such as a type of threat (e.g., human versus nature), a severity of the risk, a history of similar threats or risks, a geography of the site, a location of the various devices on the site and/or local network, one or more physical characteristics of the site, one or more security features of the site and/or devices, etc. For example, a human threat may be more likely to be individual to the camera system 120 or localized to a set of devices than a natural event, such as a fire or flood which may affect the entire physical structure and site. Moreover, a threat to a large site that has various security features or secured/isolated areas may have a lower likelihood of affecting the entire site than a threat to a small site with limited security and isolation.

In this example, when the camera system 120 determines that the threat 702 and/or risk 704 is an individual threat/risk 706 or a localized threat/risk 708, the camera system 120 can perform backup process 712. When the camera system 120 determines that the threat 702 and/or risk 704 is a network-wide threat/risk 710, the camera system 120 can perform backup process 714.

Backup process 712 can involve prioritized offloading of data stored at the camera system 120 to one or more destinations. Here, the camera system 120 can identify portions of the data having a higher or highest priority and begin offloading those portions of data first, continuing with the offloading as long as possible based on data priorities. The destination of the data can be a local destination or a remote destination (e.g., the cloud 102) based on the type of threat, the network conditions, the estimated amount of time available for the offloading before a data loss or damage occurs, etc.

For example, if the threat or risk is individual to the camera system 120, the camera system 120 may simply offload the data to an adjacent device, such as an adjacent camera system, or any other local device which may allow a high offload performance (e.g., based on latency, bandwidth, workload, congestion, connectivity, IOPS, availability, storage capacity, computing performance, etc.). On the other hand, if the threat or risk is localized and may affect additional devices in the network or site, the camera system 120 may offload the data to one or more devices having a lower risk of damage (e.g., a camera on another floor or side of the building, a server in a locked floor, etc.).

The backup process 714, initiated when the threat 702 and/or risk 704 is a network-wide threat/risk 710, can involve remote, prioritized offloading of data stored at the camera system 120. Here, the camera system 120 can remotely offload the data to one or more remote destinations, such as the cloud 102. For explanation purposes, this example will assume the cloud 102 to be the one or more remote destinations.

In the remote, prioritized offloading of backup process 714, the camera system 120 can similarly identify portions of the data having a higher or highest priority and begin offloading those portions of data first, continuing with the offloading as long as possible based on data priorities, as previously described with respect to backup process 712. In some cases, the backup process 714 can involve multiple, prioritized backup procedures, leading to offloading data to the cloud 102. For example, in a scenario where the impending risk of damage and/or network conditions prevent camera system 120 from offloading the high priority data to the cloud 102 before the expected damage or data loss, the camera system 102 can first offload such data to a local, faster destination, such as a camera system on the local network, which can then perform another prioritized offloading with the cloud 102 as the destination.

Backup process 712 and backup process 714 can also involve coordinating the offloading with other devices. For example, the camera system 120 can coordinate the offload with the cloud 102 and/or nearby devices, such as other cameras on the local network. The coordination can include, for example, surveying other devices to determine their respective status (e.g., availability, location, storage capacity, bandwidth, congestion, workload, connectivity, etc.), their respective threat or risk level, etc. The coordination can also include working with other devices to complete the offloading. For example, the camera system 120 can work with multiple camera systems in the local network to offload different portions of data to different destinations, such as different local camera systems and/or the cloud 102.

The coordination can involve working with other camera systems and/or the cloud 102 to determine what to offload first or what data, if any, can be skipped from offloading at all. This can be based on priorities ascertained for the data as well as what data has been captured by other camera systems in the local network or site. For example, if the camera system 120 communicates with other camera systems and determines that the camera system 120 and another camera system have overlapping coverage of an area and/or event, the camera system 120 may forego offloading data associated with the overlapping coverage or ensure that such data is assign a lower priority. Here, the camera system 120 can decide that backup of that data at the camera system 120 is not necessary because the other camera system already has similar data captured and stored pertaining to the overlapping coverage. If the other camera system having the overlapping coverage also has a threshold risk of damage, the camera system 120 and the other camera system can coordinate which camera system should backup the data pertaining to the overlapping coverage or which camera system should prioritize backup of such data based on the respective risks of damage and/or respective backup urgencies.

For example, the camera system having a greater risk of damage or a higher urgency can forego offloading that data to allow the other camera system to offload that data and thus allow the camera system with the greater risk of damage or higher urgency to focus on other high priority data. The degree of urgency between the camera systems can be based on a relative threat, a relative proximity to the threat, a relative amount of data to offload, a relative amount of high priority data, a relative importance to the site, etc. For example, in the case of a human threat of tampering, the camera system that is closest to the human posing the threat can be considered to have a higher urgency than other cameras, as that camera system may be likely to be tampered with by the human before the other, farther away camera systems. As another example, a camera system situated in a critical location (e.g., a bank camera closest to the vault) or storing critical data (e.g., a camera having captured an event of interest, such as a theft or burglary), can be considered to have a higher priority than other camera systems.

Backup process 712 and backup process 714 can also involve adjusting network parameters to improve backup performance over the network and/or prioritize offloaded data. For example, the local network can be forced to prioritize video files over other traffic to ensure the backup is not delayed by other traffic. As another example, the local network can be forced to disable certain traffic or services on the network, such as news feeds or data pulled from local software widgets at client devices, or even disable traffic from certain devices that are not receiving or transmitting backup data to essentially force the network to allow carry or route packets associated with the data backup. The network parameters can be adjusted by one or more devices, such as the cloud 102, a local server, a local controller, a local firewall, local switches, the camera system 120, etc. For example, in some cases, the cloud 102 can push one or more instructions to the local network to adjust one or more network parameters and/or force the network to behave a certain way or prioritize certain traffic. Non-limiting examples of network parameters that can be adjusted to prioritize traffic and provide QoS include differentiated services classifications (e.g., differentiated services code point values), CoS parameters and markings, type of service fields, P802.1p priority markings, resource reservation protocol (RSVP) reservations, traffic classification, traffic queueing and scheduling parameters, traffic filters (e.g., IP filters, MAC filters, port filters, packet tuple filters, etc.), and so forth.

Backup process 712 and backup process 714 can also involve requesting other camera systems to perform monitoring and/or video recording operations. For example, the camera system 120 can request that an adjacent camera system continue video monitoring and/or recording operations while the camera system 120 offloads data during backup process 712. In some cases, the camera system 120 can request other camera system(s) to perform video monitoring and/or recording in lieu of camera system 120 performing those functions to allow the camera system 120 to stop those operations and focus all its resources on the offloading.

Backup process 712 and backup process 714 can involve generating an alarm to alert nearby users of the threat event and/or deter any humans involved in the threat event (e.g., causing the threat 702). The alarm can be an audible alarm, a visual alarm, or another type of alarm. For example, the alarm can generate a loud audible noise, such as a siren, and activate one or more lights, such as strobe lights.

Backup process 712 and backup process 714 can also involve sending a notification to other devices and/or users of the threat 702 and/or data loss risk 704 detected. For example, camera system 120 can send a message reporting the threat 702 and/or data loss risk 704 to the cloud 120 and/or a particular individual or entity (e.g., an administrator, security personnel, and/or law enforcement), etc.

In some cases, as part of backup process 712 or backup process 714, camera system 120 can feign death to trick any attackers into believing the camera system 120 is no longer operational and thus further tampering or damage is unnecessary. For example, the camera system 120 can detect an impact from an attacker's attempt to disable the camera system 120 during an event, and thereafter feign death in order to appear as though the impact has destroyed or disabled the camera system 120. This can include turning off indicator lights at the camera system 120, playing an audio indicating that the camera system 120 is no longer recording, re-positioning the lens away from the attacker, emitting fake smoke, presenting an error code, temporarily hibernating or going to sleep mode, playing an audio file mimicking a hardware noise, etc.

In some cases, as part of backup process 712 or backup process 714, camera system 120 can stream video to one or more destinations. The video streamed can be video files being offloaded, video captured and/or recorded by the camera system 120 during the backup process 712, etc.

When the threat 702 and/or risk 704 is a network-wide threat/risk 710, the backup process 714 can involve a procedure for prioritizing camera systems. For example, offloading of data from the various camera systems in the network to the cloud 102 can be prioritize by respective priorities assigned to the camera systems and/or their stored data. To illustrate, during a fire that is expected to damage all camera systems in a site, the cloud 102 can instruct one or more camera systems to offload their data (or their high priority data) first, and instruct other camera systems to offload their data (or their high priority data) after higher priority camera systems. This can ensure that the most important, site-wide data is offloaded first. Prioritization between camera systems can be determined based on one or more factors, such as respective locations, respective proximities to the threat 702, respective urgencies, etc. For example, camera systems closer to the fire can be offloaded to the cloud 102 before camera systems further away from the fire. This can increase the likelihood that data from the camera systems closer to the fire are backed up before being damaged. As the fire spreads through the site, priorities of camera systems can be dynamically adjusted to allow camera systems closer to the fire offload data before camera systems further away from the fire which may have more time to offload data before being damaged.

As another example, camera systems can be prioritized based on their respective locations or importance. For example, camera systems closer to the event or camera systems closer to an area of interest, such as a safe or a door, are offloaded before camera systems in other areas that may not be of such high interest, such as camera systems located away from the event or in a different floor with a lower number of items of value.

The prioritization of camera systems can also be based on their stored data. For example, a camera system having a large number of high priority or critical video files can be prioritized over a camera system having a lower number of high priority or critical video files. In some cases, the prioritization of backups involving multiple camera systems may vary throughout the backup process. For example, instead of relying on camera-specific priorities, the network-wide data at the camera systems can be offloaded according to the relative priorities of the data, which may result in a camera system that may otherwise be considered higher priority than another camera system yielding to the other camera system. For example, a higher priority camera system can begin offloading data before a lower priority camera system based on the respective priorities of the camera systems. The offloading may reach a point where the priorities of data remaining to be offloaded at the higher priority camera system have a lower priority than a portion of data at the lower priority camera system. Here, the higher priority camera system may yield to the lower priority camera system, to allow the lower priority camera system to offload the higher priority portion of data before the higher priority camera system continues its offloading of data. Thus, the offloading between the various camera systems can be performed in a distributed and prioritized fashion which may involve interruptions of data offloads at specific camera systems to allow other camera systems to offload higher priority data. In some cases, the offload process between the multiple cameras can function as a queue of camera-specific data that is based on relative priorities of the data across the multiple cameras.

In some cases, the prioritization of camera systems and/or data across camera systems can be managed by the cloud 102. For example, the cloud 102 can intelligently select which camera systems and/or data to be offloaded next and/or assign priorities to the camera systems and/or data across the network. However, in some cases, the prioritization can also be coordinated by one or more camera systems 120 and/or local devices 118 either with or without coordination with the cloud 102. For example, the prioritization can be coordinated among the various camera systems based on threat levels, urgencies, data priorities, camera system priorities, network conditions, camera system status information, etc.

In some cases, backup process 714 can also involve disabling certain camera system(s) during the backup process. For example, the cloud 102 can disable one or more camera systems having a low priority to reduce network congestion and allow higher camera systems to offload their data first or without potential interruption from other camera systems. The cloud 102 can also or otherwise disable other devices in the network to further reduce congestion during the backup process 714. For example, the cloud 102 can disable one or more servers, client devices, network resources (e.g., network printers, network televisions, IP phones, etc.), network segments (e.g., VLANs, switches, subnets, bridge domains, etc.), etc., to reduce network traffic and congestion during the threat event.

Figure 8:
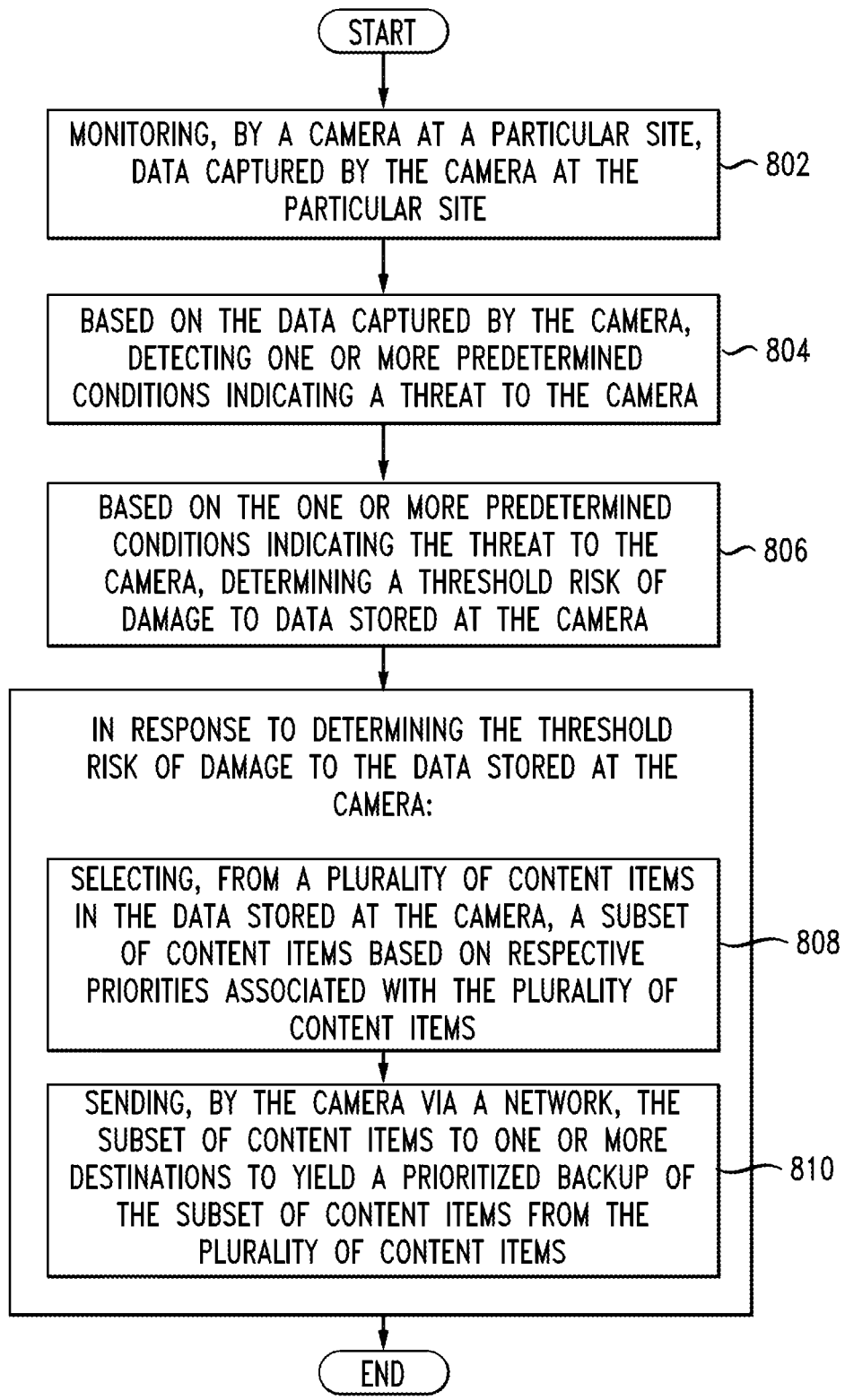
FIG. 8 illustrates an example method for protecting data on a camera from physical attacks.

Having disclosed example system components and concepts, the disclosure now turns to the example method for prioritized backups of recorded camera data shown in FIG. 8. For the sake of clarity, the method is described with reference to the camera systems 120 and cloud 102, as shown in FIG. 1, configured to perform the various steps in the method. The steps outlined herein are examples and can be implemented in any combination thereof, including combinations that exclude, add, or modify certain steps.

At step 802, the camera system 120 monitors data captured by the camera system 120 at a particular site. The particular site can be a site or location of the camera system 120, such as an office, a park, a street, a building, a garage, a hospital, a campus, an intersection, etc. The data can include data captured by the camera system 120, such as image data, video data, audio, sensor data, metadata, etc. The data can also include other data collected by the camera system 120, such as statistics, reports, alarms, news, calculations by other devices (e.g., other camera systems 120, the cloud 102, etc.), and so forth.

The camera system 120 can capture the data and store the data on a local storage of the camera system 120, such as a disk or storage device, a memory device, or any onboard storage device on the camera system 120. The stored data can include video and image footage (e.g., images, frames, pixels, video files or segments, etc.) recorded by the camera system 120 via one or more sensors, such as a lens or image sensor, audio and/or sensor data captured by one or more sensors, etc. The recorded video and image footage can capture a specific scene within the field of view of the camera system 120 during a particular period of time while the camera system 120 is operational and recording. For example, the recorded video and image footage can include video of a specific scene or view recorded by the camera system 120 over a period of time. Thus, the data can include events occurring within the scene during the period of time, which have been captured and recorded by the camera system 120.

Based on the data captured by the camera system 120, at step 804, the camera system 120 can detect one or more predetermined conditions indicating a threat to the camera. The one or more predetermined conditions can be detected based on analyzing, classifying, and recognizing video elements, image elements, audio, sensor data, scene characteristics, etc. For example, the one or more predetermined conditions can be detected by analyzing the data and performing one or more data analysis, classification, recognition, and/or detection operations, such as camera tampering detection, human detection, emotion detection, object-in-hand detection, video labeling, video segmentation, object detection and/or searching, facial recognition, speech recognition, object shape or attribute detection, motion detection, human activity recognition, visual detection, noise reduction, filtering, audio classification, object tracking, object positioning, computer vision, sound localization, natural language processing, feature extraction, etc.

The one or more predetermined conditions can determined based on one or more factors which indicate a human threat, such as vandalism, or a natural threat, such as a fire or flood. The one or more factors can be determined based on the one or more operations on the analyzing, classifying, detecting and recognizing operations. The one or more factors can include an event, such as a fight, a commotion, an argument, a crime, an activity, a tornado, a fire, a flood, etc.; an object, such as a weapon, a bat, a brick, etc.; a status of the camera system 120 and/or the scene, such as an obstruction of view of the camera system 120, a disappearing object from a scene or area, a re-positioning of the camera system 120, an impact to the camera system 120 and/or an object within the scene or view (e.g., an impact to a human, car, building, door, etc.), etc.; a sound, such as a loud noise, a scream, a crash, a breaking sound, a blast, a thunder, an alarm, etc.; speech, such as an argument, a comment, a verbal threat, etc.; a motion, such as a human motion, an object motion, a camera motion, etc.; a signal from one or more devices, such as an alert from another camera system, a message from the cloud 102, a report from the news, etc.

The one or more factors can also include specific characteristics associated with a human or object in a surrounding area, which can be considered when detecting the one or more predetermined conditions or identifying the threat. For example, the one or more factors can include a human gesture, a facial recognition, a human emotion, a sound classification, an object identity, an object or human position or placement, etc. Certain factors or characteristics can be indicative of a specific condition or threat, such as certain emotions (e.g., anger, aggression, distrust, nervousness, sadness, confusion, etc.), certain gestures (e.g., aggressive hand or body gestures, hand signaling, etc.), certain activities (e.g., fighting, pointing, aiming with an object, hiding, screaming, attacking a human or property, etc.), certain noises (e.g., thunder, blasts, loud noises, alarms, breaking noises, etc.), certain speech (e.g., verbal threats, aggressive speech, loud speech, aggressive tone, suggestive comments, etc.), certain movements (e.g., camera view obstruction movements, object concealment, furtive movements, etc.), certain behavior (e.g., erratic behavior, aggressive behavior, suggestive behavior, etc.), certain audio cues (e.g., sound proximity or direction, sound level or frequency, etc.), certain objects can be indicative of a threat (e.g., weapons, bricks, bats, hammers, etc.), and so forth.

Based on the one or more predetermined conditions indicating the threat to the camera system 120, the camera system 120 determines a threshold risk of damage to data stored at the camera system 120. The threshold risk can be determined by identifying the threat posed by the one or more conditions, and estimating or predicting the likelihood that such threat may result in damage to the camera system 120 or loss of data stored on the camera system 120. The threshold risk and threat can be determined based on the one or more factors determined based on the data at the camera system 120, as well as predetermined rules, algorithms, deep learning networks, classification models, metrics, data representations, constraints, user preferences, etc. For example, the camera system 120 can consider a list of rules to determine a risk and threat; mapping the one or more conditions and/or associated factors to specific risk or threat factors predefined for assessing risks and threats; generating one or more classification models based on the data; implementing machine learning algorithms, deep learning and neural networks, etc.

When determining the threshold risk of damage and or the threat, the camera system 120 can also collect and analyze other data, such as statistics, captured data from other camera systems (e.g., video, image, audio, and sensor data captured by other camera systems in the particular area), information obtained from one or more sources such as the Internet or a news site, threat or condition alerts, weather data, external databases (e.g., law enforcement databases, forecast databases, incident databases, databases maintained by states or municipalities, etc.), risk assessment factors or results from other devices (e.g., other camera systems on the network, the cloud 102, etc.), user input (e.g., preferences, notifications, etc.), and so forth. The camera system 120 can also coordinate with other devices, such as nearby camera systems or the cloud 102, to determine the threshold risk or the threat associated with the one or more predetermined conditions. For example, the camera system 120 can communicate with other camera systems that have captured video in the surrounding area to request verification of a threat or risk assessment or comparison of respective threat or risk assessments, and/or the cloud 102 to request a determination or assessment from the cloud 102.

The camera system 120 can also consider information gathered from previous events associated with the camera system 120 or other camera systems. For example, the camera system 120 can review factors and/or conditions identified from 1000 damage events encountered by various camera systems, and use those factors and/or conditions to aid in estimating the likelihood that one or more conditions or factors detected pose a threat and a threshold risk.

The threshold risk determination and/or threat detection can be relative to a surrounding area associated with the camera system 120, the particular site, other camera systems on the local network, a geographic region, etc. Moreover, the threshold risk determination and/or threat detection can depend on a context of the camera system 120, including a location, a date, a time, an environment, etc. For example, a hammer or brick may indicate a significant threat and risk of damage if detected inside a hospital but may indicate a much lower threat or risk of damage if detected in a construction site. As another example, a gun may pose a significant threat and risk of damage if detected in an urban city street, but a much lower threat or risk of damage if detected in a gun range.

The detection performed in step 804 as well as the determination in step 806 can be performed by the camera system 120, as described herein. However, in some configurations, the detection in step 804 and/or determination in step 806 can be performed by one or more other devices either entirely by those one or more devices or in coordination with the camera system 120. For example, in some configurations, the detection and determination in steps 804 and 806 can be performed entirely by the cloud or by the cloud 102 in coordination with the camera system 120. To illustrate, the cloud 102 can execute one or more algorithms or operations to make the detection in step 804 and/or the determination in step 806, and communicate the results with the camera system 120. In some cases, the cloud 102 can also communicate specific instructions to the camera system 120 along with such results, as described herein.

The threshold risk can depend on user preferences and/or context information. For example, in some cases, an administrator may configure a low threshold or sensitivity for the risk. In other examples, the administrator may configure a high threshold or sensitivity for the risk. The threshold or sensitivity can depend on user preferences, which may depend on the value of what is being surveilled by the camera system 102 (e.g., a bank may have a lower threshold than a soccer field), the inherent risk in the area of the particular site or camera system 102 (e.g., high crime area may have a lower threshold than a low crime area, a nuclear facility may have a lower threshold than a toy factory, etc.), the time or date of the event (e.g., night hours may be configured to apply a lower threshold than daytime hours), etc.

In response to determining the threshold risk of damage to the data stored at the camera system 120, at step 808 the camera system 120 can select, from a plurality of content items in the data stored at the camera system 120, a subset of content items based on respective priorities associated with the plurality of content items. The content items can include content captured by the camera system 120, such as video, image data, audio, sensor data, etc. In some examples, the content items can include video frames, files, clips, or segments. The subset of content items selected by the camera system 120 can refer to the highest priority content items, the content items assigned the top n priorities, the content items within a ranking or priority category assigned with the most important or critical items, etc.

The step of selecting the subset of content items can include a prior step of identifying the respective priorities for the plurality of content items. The priorities can be identified based on the content associated with the content items, metadata associated with the content items, dates associated with the content items, events associated with the content items, humans associated with the content items, objects associated with the content items, etc. For example, assume the content items are video files. The priorities can be determined for the video files based on the content of the video files and/or a time of capture of the video files.

To illustrate, the video files can be analyzed to extract specific features within the video files, detect specific humans captured in the video files, detect specific objects within the video files, detect specific events captured in the video files, detect specific activities captured in the video files, detect specific conditions or threats captured in the video files, etc. The priorities can then be identified based on the humans, events, activities, objects, conditions, threats, etc., that are or are not detected in the video files. For example, video files capturing events or activities can be assigned higher priorities than video files that do not capture any events or activities. As another example, video files that capture a specific human or event can be assigned a higher priority than other video files. In some cases, video files that are closer in time or proximity to a particular event, such as an event represented by the one or more predetermined conditions detected indicating the threat, can be assigned a higher priority than other video files. In some cases, the more recent video files can be assigned higher priorities than older video files.

After identifying the priorities of the video files, the subset of video files can be selected by comparing the respective priorities of the various video files. Here, the video files with higher priorities can be selected over video files with lower priorities. In this example, the goal can be to use the priorities to perform a prioritized backup and preserve as much high priority video files as possible prior to any damage or data loss. For example, the goal can be to preserve as much video files leading up to the event causing the risk and/or destruction as possible.

In response to determining the threshold risk of damage to the data stored at the camera system 120, at step 810 the camera system 120 can send, via a network (e.g., local network 116), the subset of content items to one or more destinations to yield a prioritized backup of the subset of content items from the plurality of content items. Here, the camera system 120 can begin offloading the subset of content items to the one or more destinations as part of the prioritized backup. If the camera system 120 is able to offload all of the items in the subset of content items prior to being damaged, the camera system 120 can continue with the prioritized backup by sending a next subset of content items, which can be a items having a next, lower priority.

The one or more destinations can include one or more devices on the local network of the camera system 120, such as other devices or camera systems on the local network, and/or the cloud 102. The one or more destinations can depend based on the threshold risk of damage, the threat, network conditions, device status information, the type of threat, etc. As previously explained, the camera system 120 can select the one or more destinations and send the subset of content items to the selected one or more destinations as part of the prioritized backup. The camera system 120 can continue to offload other subsets of content items to the selected one or more destinations based on the respective priorities until it is no longer possible due to damage to the camera system 120 and/or network. The camera system 120 can also dynamically select new or different destinations based on threat, risk or network conditions, for example.

In the event that the threshold risk is a false alarm or false positive, the content items backed up by the camera system 120 can be deleted after certain criteria are met, such as a lapse of time, a user input, an administrator approval, etc.

When sending the subset of content items to the one or more destinations, the network can be forced to prioritize the traffic containing the subset of content items over other network traffic. For example, assuming the subset of content items is a subset of video files as described in the previous example, the network can be adjusted to prioritize the video files over other network traffic, such as VoIP traffic, website traffic, etc.

In some cases, the backups performed by the camera system 120 can be proactive in anticipation of an event that has not occurred and may not be as imminent, such as a hurricane expected at the particular site on a future date.

Moreover, the prioritized backup can be performed in coordination with backups simultaneously or contemporaneously performed by other camera systems in the local network. For example, priorities of content items can be determined across the content items on the camera systems as a whole, and the backup can be performed based on the relative priorities across the network. As another example, relative priorities can be determined for multiple camera systems on the local network based on other factors such as overlapping coverage, content quality, network or device conditions, respective proximities of the camera systems to one or more particular events, etc. For example, content items estimated to provide overlapping coverage can be considered together in order to avoid duplicate backups. Content items estimated to capture a better view (e.g., closer proximity, better quality, better angle, etc.) of an event can be prioritized over other content items associated with the event.

The steps described herein with respect to FIG. 8 can be performed by camera system 120, cloud 102, camera system 102 in coordination with cloud 102 and/or other camera systems, etc. For the sake of clarity and explanation purposes, steps 802-810 are described herein as being performed by the camera system 120. However, it should be noted that in other configurations, any step or combination of steps 802-810 can be performed by the cloud 102 alone or in coordination with the camera system 120 as well as other devices in and out of the network. For example, in some configurations, the cloud 102 can be configured to automate one or more of the steps and control the camera system 120 and/or any other device on the local network, to perform the one or more steps.

Figure 9:
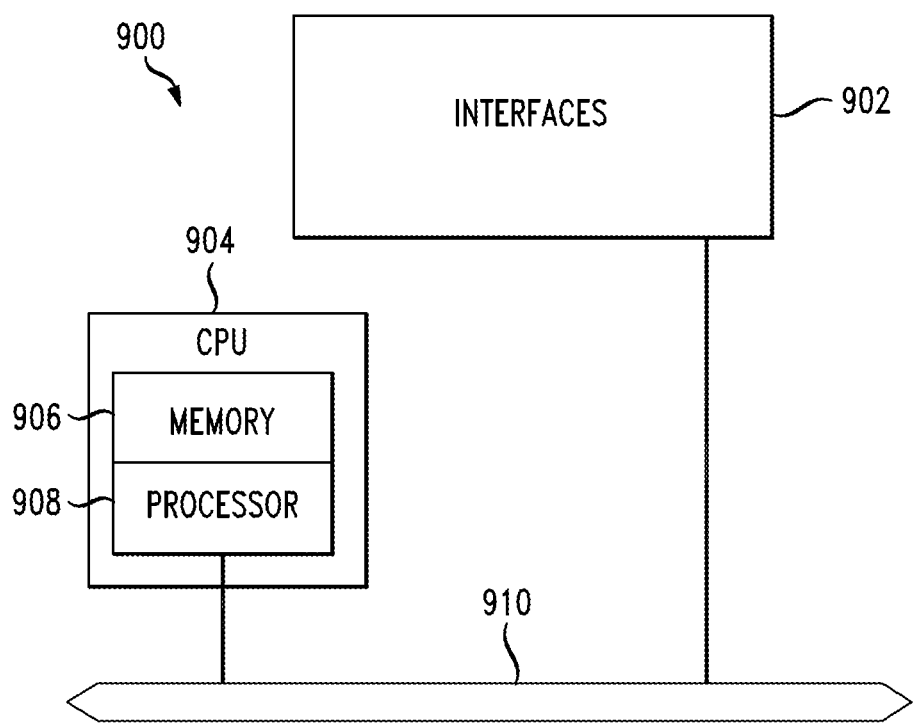
FIG. 9 illustrates an example network device.
Figure 10:
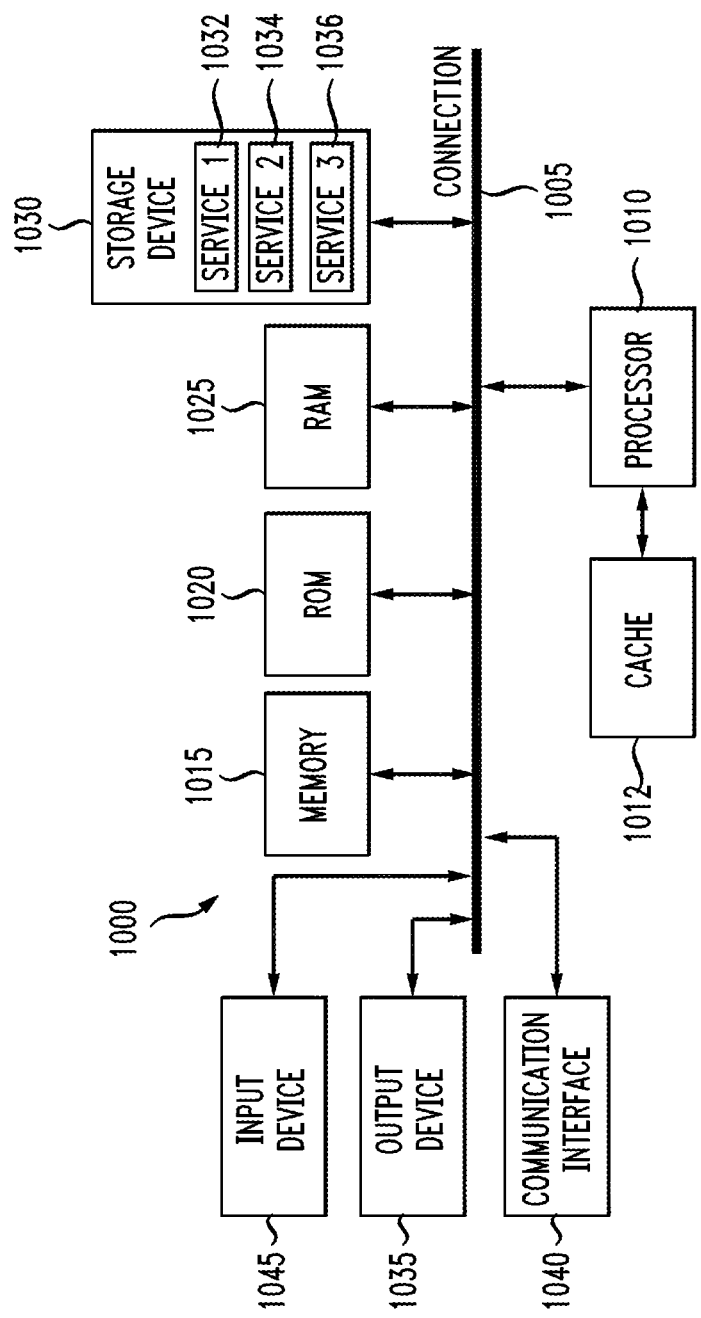
FIG. 10 illustrates an example computing device.

The disclosure now turns to FIGS. 9 and 10, which illustrate example network devices and computing hardware components, such as switches, routers, controllers, client devices, computing device hardware, and so forth.

FIG. 9 illustrates an example network device 900 suitable for performing switching, routing, assurance, and other networking operations. Network device 900 includes a central processing unit (CPU) 904, interfaces 902, and a connection 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, TCAM, etc.) also forms part of CPU 904. However, there are many different ways in which memory could be coupled to the system. In some cases, the network device 900 can include a memory and/or storage hardware, such as TCAM, separate from CPU 904. Such memory and/or storage hardware can be coupled with the network device 900 and its components via, for example, connection 910.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 904 to efficiently perform routing computations, network diagnostics, security functions, etc.

Although the system shown in FIG. 9 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing, switching, and/or other operations. The ASIC can communicate with other components in the network device 900 via the connection 910, to exchange data and signals and coordinate various types of operations by the network device 900, such as routing, switching, and/or data storage operations, for example.

FIG. 10 illustrates a computing system architecture 1000 including components in electrical communication with each other using a connection 1005, such as a bus. System 1000 includes a processing unit (CPU or processor) 1010 and a system connection 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
monitoring, at a particular site, data captured by the camera at the particular site;
based on the data captured by the camera, detecting one or more predetermined conditions indicating a threat at the particular site;
based on the one or more predetermined conditions indicating the, determining a risk of damage to data stored by the camera;
in response to determining the risk of damage exceeds a threshold:
determining whether the threat is an individualized threat to the camera or a threat to at least a portion a local network at the particular site;
selecting, based on a result of the determining, one or more destinations which are less vulnerable to the threat; and
sending, via a network, at least a subset of content items stored by the camera to the one or more destinations.

2. The method of claim 1, wherein the at least a subset of content items comprises video files having a highest priority.

3. The method of claim 1, wherein the one or more predetermined conditions comprise at least one of a presence of an object, an obstruction of a field of view of the camera, a tampering event, an activity at the particular site, a fire, a flood, and a physical impact to the camera.

4. The method of claim 3, wherein the data captured by the camera comprises at least one of video content, image content, or sensor data, wherein the one or more predetermined conditions comprise the tampering event, and wherein the method further comprises detecting the tampering event based on the at least one of the video content, the image content, or the sensor data.

5. The method of claim 1, wherein the content items comprise video files captured by the camera, the method further comprising:
determining respective priorities of the video files based on at least one of a respective time of capture, a respective content of the video files, a respective event captured in the video files, a respective proximity in time between a respective recording of the video files and an occurrence of a particular event, a respective object captured in one or more of the video files, a respective activity captured in one or more of the video files, and a respective quality of content of the video files.

6. The method of claim 5, wherein priority of the video files is determined by assigning a highest priority to those of the video files having at least one of a time of capture within a threshold period of time, a recorded event, or a recorded motion.

7. The method of claim 1, wherein sending the at least a subset of content items comprises adjusting one or more network parameters to prioritize network transmission of the at least a subset of content items, the one or more network parameters comprising at least one of quality of service parameters, class of service parameters, and bandwidth allocation parameters.

8. A camera system comprising:
one or more processors; and
at least one computer-readable storage medium having stored therein instructions which, when executed by the one or more processors, cause the camera system to:
monitor, at a particular site, data captured by at least one camera at the particular site;
based on the data captured by the at least one camera, detect one or more predetermined conditions indicating a threat at the particular site;
based on the one or more predetermined conditions indicating the threat, determine a risk of damage to data stored by the at least one camera;
in response to determining the risk of damage exceeds a threshold:
determine whether the threat is an individualized threat to the at least one camera or a threat at least a portion a local network that at the particular site;
selecting, based on a result of the determination, one or more destinations which are less vulnerable to the threat; and
send via a network, at least a subset of content items stored by the at least one camera to the one or more destinations.

9. The system of claim 8, wherein the at least a subset of content items comprises video files having a highest priority.

10. The system of claim 8, wherein the one or more predetermined conditions comprise at least one of a presence of an object, an obstruction of a field of view of the at least one camera, a tampering event, an activity at the particular site, a fire, a flood, and a physical impact to the at least one camera.

11. The system of claim 10, wherein the data captured by the at least one camera comprises at least one of video content, image content, or sensor data, wherein the one or more predetermined conditions comprise the tampering event, and wherein the operations further comprise detecting the tampering event based on the at least one of the video content, the image content, or the sensor data.

12. The system of claim 8, wherein the content items comprise video files captured by the at least one camera, operations further comprising:
determining respective priorities of the video files based on at least one of a respective time of capture, a respective content of the video files, a respective event captured in the video files, a respective proximity in time between a respective recording of the video files and an occurrence of a particular event, a respective object captured in one or more of the video files, a respective activity captured in one or more of the video files, and a respective quality of content of the video files.

13. The system of claim 12, wherein priority of the video files is determined by assigning a highest priority to those of the video files having at least one of a time of capture within a threshold period of time, a recorded event, or a recorded motion.

14. The system of claim 8, wherein sending the at least a subset of content items comprises adjusting one or more network parameters to prioritize network transmission of the at least a subset of content items, the one or more network parameters comprising at least one of quality of service parameters, class of service parameters, and bandwidth allocation parameters.

15. A non-transitory computer-readable storage media comprising instructions stored therein which, when executed by one or more processors, cause a camera system to:
monitor, at a particular site, data captured by at least one camera at the particular site;
based on the data captured by the at least one camera, detect one or more predetermined conditions indicating a threat at the particular site;

based on the one or more predetermined conditions indicating the threat, determine a risk of damage to data stored by the at least one camera;

in response to determining the risk of damage exceeds a threshold:

determine whether the threat is an individualized threat to the at least one camera or a threat at least a portion a local network that at the particular site;

selecting, based on a result of the determination, one or more destinations which are less vulnerable to the threat; and send via a network, at least a subset of content items stored by the at least one camera to the one or more destinations.

16. The media of claim 15, wherein the at least a subset of content items comprises video files having a highest priority.

17. The media of claim 15, wherein the one or more predetermined conditions comprise at least one of a presence of an object, an obstruction of a field of view of the at least one camera, a tampering event, an activity at the particular site, a fire, a flood, and a physical impact to the at least one camera.

18. The media of claim 17, wherein the data captured by the at least one camera comprises at least one of video content, image content, or sensor data, wherein the one or more predetermined conditions comprise the tampering event, and wherein the operations further comprise detecting the tampering event based on the at least one of the video content, the image content, or the sensor data.

19. The media of claim 15, wherein the content items comprise video files captured by the at least one camera, the operations further comprising:

determining respective priorities of the video files based on at least one of a respective time of capture, a respective content of the video files, a respective event captured in the video files, a respective proximity in time between a respective recording of the video files and an occurrence of a particular event, a respective object captured in one or more of the video files, a respective activity captured in one or more of the video files, and a respective quality of content of the video files.

20. The media of claim 19, wherein priority of the video files is determined by assigning a highest priority to those of the video files having at least one of a time of capture within a threshold period of time, a recorded event, or a recorded motion.

* * * * *